United States Patent
Yoo et al.

(10) Patent No.: US 11,271,304 B2
(45) Date of Patent: Mar. 8, 2022

(54) MULTI FEEDING ANTENNA AND ELECTRONIC DEVICE INCLUDING SAME

(71) Applicant: Samsung Electronics Co., Ltd., Gyeonggi-do (KR)

(72) Inventors: Chaeup Yoo, Gyeonggi-do (KR); Woosuk Kang, Gyeonggi-do (KR); Youngjae Ko, Gyeonggi-do (KR); Sewoong Kim, Gyeonggi-do (KR); Sangbong Sung, Gyeonggi-do (KR); Sanggon Shin, Gyeonggi-do (KR); Inyoung Lee, Gyeonggi-do (KR); Jinwoo Jung, Gyeonggi-do (KR); Suk Hyun, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/965,904

(22) PCT Filed: Jan. 23, 2019

(86) PCT No.: PCT/KR2019/000958
§ 371 (c)(1),
(2) Date: Jul. 29, 2020

(87) PCT Pub. No.: WO2019/151706
PCT Pub. Date: Aug. 8, 2019

(65) Prior Publication Data
US 2021/0057819 A1    Feb. 25, 2021

(30) Foreign Application Priority Data

Jan. 30, 2018  (KR) .................. 10-2018-0011481

(51) Int. Cl.
*H01Q 1/27* (2006.01)
*H01Q 5/35* (2015.01)
(Continued)

(52) U.S. Cl.
CPC .................. *H01Q 5/35* (2015.01); *H01Q 1/38* (2013.01); *H01Q 1/48* (2013.01); *H04M 1/0266* (2013.01); *H01Q 1/243* (2013.01); *H04M 1/0283* (2013.01)

(58) Field of Classification Search
CPC ............ H01Q 1/273; H01Q 1/38–1/48; H01Q 1/243; H01Q 5/30–5/35; H01Q 7/00
See application file for complete search history.

(56) References Cited

U.S. PATENT DOCUMENTS

2006/0227058 A1    10/2006  Zellweger et al.
2011/0013491 A1*   1/2011   Fujisawa ............... G04C 10/02
                                                  368/10

(Continued)

FOREIGN PATENT DOCUMENTS

CN    106299678    1/2017
CN    106647236    5/2017
(Continued)

OTHER PUBLICATIONS

Chinese Office Action dated Jun. 1, 2021 issued in counterpart application No. 201980010964.5, 13 pages.

(Continued)

*Primary Examiner* — Hasan Islam
(74) *Attorney, Agent, or Firm* — The Farrell Law Firm, P.C.

(57) ABSTRACT

According to various embodiments, an electronic device includes a front plate, a rear plate facing away from the front plate, and a side member surrounding the space between the front plate and the rear plate. The side member comprises: a housing including a conductive annular member; at least one mounting member connected to the side member and detachably mounted to a portion of the human body such that the rear plate is configured to be oriented toward a (Continued)

portion of the human body; a substrate (PCB) disposed in parallel with the front plate in the space and including a ground plane; at least one wireless communication circuit disposed on the substrate; a first electrical path connected between the wireless communication circuit and a first point of the conductive annular member; and a second electrical path connected between the ground plane and a second point of the conductive annular member, wherein a first region of the conductive annular member defined between the first point and the second point has a first length, and a second region of the conductive annular member defined between the first point and the second point has a second length that is shorter than the first length, wherein the side member includes an extension part disposed in the space and extending along a first region of the annular member or a portion of the second region and may include a conductive pattern electrically connected to the wireless communication circuit. Various other embodiments may be possible. Various embodiments may be possible.

13 Claims, 26 Drawing Sheets

(51) Int. Cl.
    *H01Q 1/38*     (2006.01)
    *H01Q 1/48*     (2006.01)
    *H04M 1/02*     (2006.01)
    *H01Q 1/24*     (2006.01)

(56) References Cited

U.S. PATENT DOCUMENTS

| | | | |
|---|---|---|---|
| 2014/0117093 A1 | 5/2014 | Lawrence et al. | |
| 2016/0254587 A1 | 9/2016 | Jung et al. | |
| 2016/0294038 A1* | 10/2016 | Lo | H01Q 1/48 |
| 2017/0040701 A1* | 2/2017 | Hanabusa | H01Q 1/273 |
| 2017/0168462 A1 | 6/2017 | Ryu et al. | |
| 2017/0179581 A1* | 6/2017 | Puuri | H01Q 9/0457 |
| 2017/0214422 A1* | 7/2017 | Na | H01Q 5/35 |
| 2017/0288298 A1 | 10/2017 | Kim | |
| 2017/0358850 A1 | 12/2017 | Vanjani | |
| 2017/0373381 A1 | 12/2017 | Robinson et al. | |
| 2018/0013947 A1 | 1/2018 | Kim | |
| 2019/0109367 A1* | 4/2019 | Tseng | H01Q 1/241 |
| 2021/0119490 A1* | 4/2021 | De Sousa | G04C 10/00 |

FOREIGN PATENT DOCUMENTS

| | | |
|---|---|---|
| CN | 106785355 | 5/2017 |
| CN | 206400285 | 8/2017 |
| EP | 1 489 471 | 12/2004 |
| JP | 2007295177 | 11/2007 |
| JP | 2013040793 | 2/2013 |
| KR | 1020160089785 | 7/2016 |
| KR | 1020170112508 | 10/2017 |

OTHER PUBLICATIONS

PCT/ISA/210 Search Report issued on PCT/KR2019/000958, dated Apr. 30, 2019, pp. 5.
PCT/ISA/237 Written Opinion issued on PCT/KR2019/000958, dated Apr. 30, 2019, pp. 5.

* cited by examiner

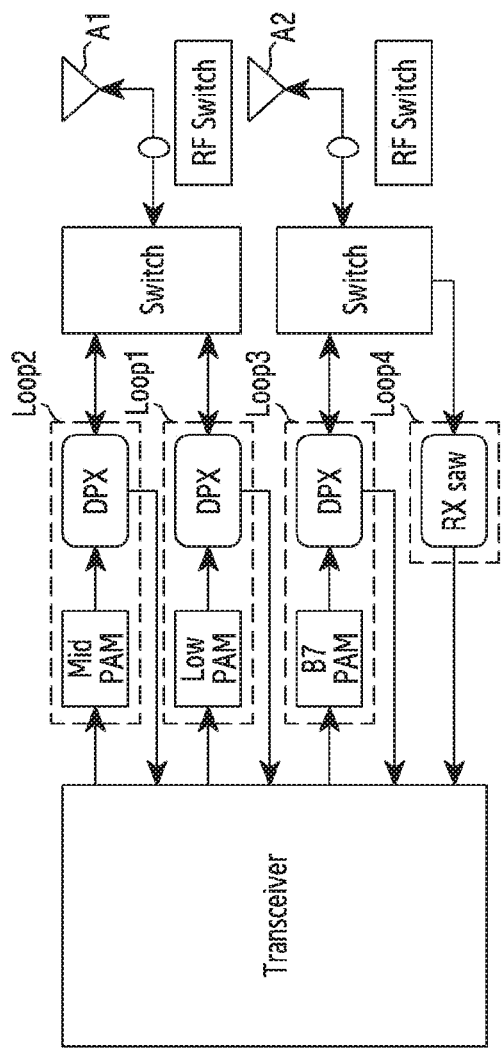

MULTI FEEDING ANTENNA AND ELECTRONIC DEVICE INCLUDING SAME

PRIORITY

This application is a National Phase Entry of PCT International Application No. PCT/KR2019/000958, which was filed on Jan. 23, 2019, and claims priority to Korean Patent Application No. 10-2018-011481, which was filed on Jan. 30, 2018, the content of each of which are incorporated herein by reference.

BACKGROUND

1. Field

Various embodiments of the disclosure relate to an antenna using multi-feeding and an electronic device including the antenna.

2. Description of the Related Art

Electronic devices with various functions have been introduced with development in electronic communication technology. These electronic devices usually have a convergence function that complexly performs one or more functions. Electronic devices include antennas supporting various frequency bands to perform various functions.

It has been attempted to increase the such and reinforce the design-related respect of electronic devices that have gradually become slim to satisfy the purchase desire of customers, as the functional differences of electric devices are remarkably reduced. As a part of this tendency, it has been attempted to increase the strength of electronic devices, make electronic devices elegant, and improve the aesthetic appearance of electronic device by replacing the materials of the components (e.g., a housing) with a metal material.

Since electronic devices are made thin in terms of the design and the space for mounting antennas is insufficient, when a metallic housing is used, the radiation performance of antennas may be considerably deteriorated. For example, when there are metallic parts or metallic internal/external members around an antenna, the performance of an antenna radiator may be rapidly decreased due to various items of phenomenon such as a diffusion effect by metal, a confinement effect of an electromagnetic filed, or unconformity. Electronic device, in the past, had a sufficient space for mounting antennas and sufficient gaps between antennas and metal, and the outer materials of the products were dielectrics such as plastic, so there is no problem in manufacturing of antennas. However, current electronic devices gradually become slim to increase the purchase desire of customers and metal is more frequently used, so the distances between antennas and metallic parts and metallic members are decreased. Accordingly, it may be difficult to secure sufficient additional performance from existing antenna technology.

For example, a wearable device that is supposed to be worn on a human body may include at least one antenna that operates in at least one frequency band and antennas should be spaced over a predetermine distance in consideration of the frequency characteristic. Accordingly, the size of the device may be increased, or arrangement of electric parts on a substrate is complicated, which may cause a circuit loss.

A space for mounting antennas can be secured by electrically connecting and using a wireless communication circuit and a metal housing (e.g., bezel) as antennas in electronic devices. However, since electronic devices using an outer metal housing as an antenna, for example, wearable device usually operate on a human body, the performance may be rapidly decreased by the human body when an outer metal housing is used as an antenna.

Various embodiments can provide an antenna using multi-feeding and an electronic device including the antenna.

Various embodiments can provide an antenna using multi-feeding that is configured to prevent deterioration of the performance of an antenna due to a human body, and an electronic device including the antenna.

SUMMARY

According to an embodiment, an electronic device includes: a housing including a front plate, a rear plate facing an opposite direction to the front plate, and a side member surrounding a space between the front plate and the rear plate and including a conductive annular member; at least one mounting member connected to the side member and detachably mounted on a portion of a human body such that the rear plate faces the portion of the human body; a substrate (PCB) disposed in the space in parallel with the front plate and having a ground plane; at least one wireless communication circuit disposed on the substrate; a first electrical path connected between the wireless communication circuit and a first point of the conductive annular member; a second electrical path connected between the ground plane and a second point of the conductive annular member in which a first region of the conductive annular member defined between the first point and the second point has a first length and a second region of the conductive annular member defined between the first point and the second point has a second length smaller than the first length; and a conductive pattern disposed in the space, having an extension that extends along a portion of the first region or the second region of the annular member, and electrically connected to the wireless communication circuit.

According to various embodiments, an electronic device includes: a housing including a front plate, a rear plate facing an opposite direction to the front plate, and a side member surrounding a space between the front plate and the rear plate, in which the side member has a substantially rectangular shape when seen from above the front plate and has a first portion having a first length and extending in a first direction, a second portion having a second length larger than the first length and extending in a second direction perpendicular to the first direction, a third portion having the first length and extending in the first direction in parallel with the first portion, and a fourth portion having the second length and extending in the second direction in parallel with the second portion; a substrate disposed in the space and having a ground electrically connected with two points spaced a predetermined distance apart from each other in the fourth portion; a wireless communication circuit mounted on the substrate, electrically connected to a first point between the two points in the fourth portion, and providing wireless communication in a first frequency range; and a conductive pattern disposed at a position where it can be coupled to the fourth portion, and electrically connected with the wireless communication circuit, in which the wireless communication circuit may be configured to provide wireless communication in a second frequency band.

According to various embodiments of the disclosure, at least one antenna is powered by coupling in a radiation path of another antenna, whereby an electronic device can be made slim and a high band can be implemented by a second antenna with interference by a first antenna minimized.

BRIEF DESCRIPTION. OF DRAWINGS

FIG. 6B is a schematic block diagram of a diversity antenna related to the graph shown in FIG. 6A according to various embodiments of the disclosure;

DETAILED DESCRIPTION

Figure 1:
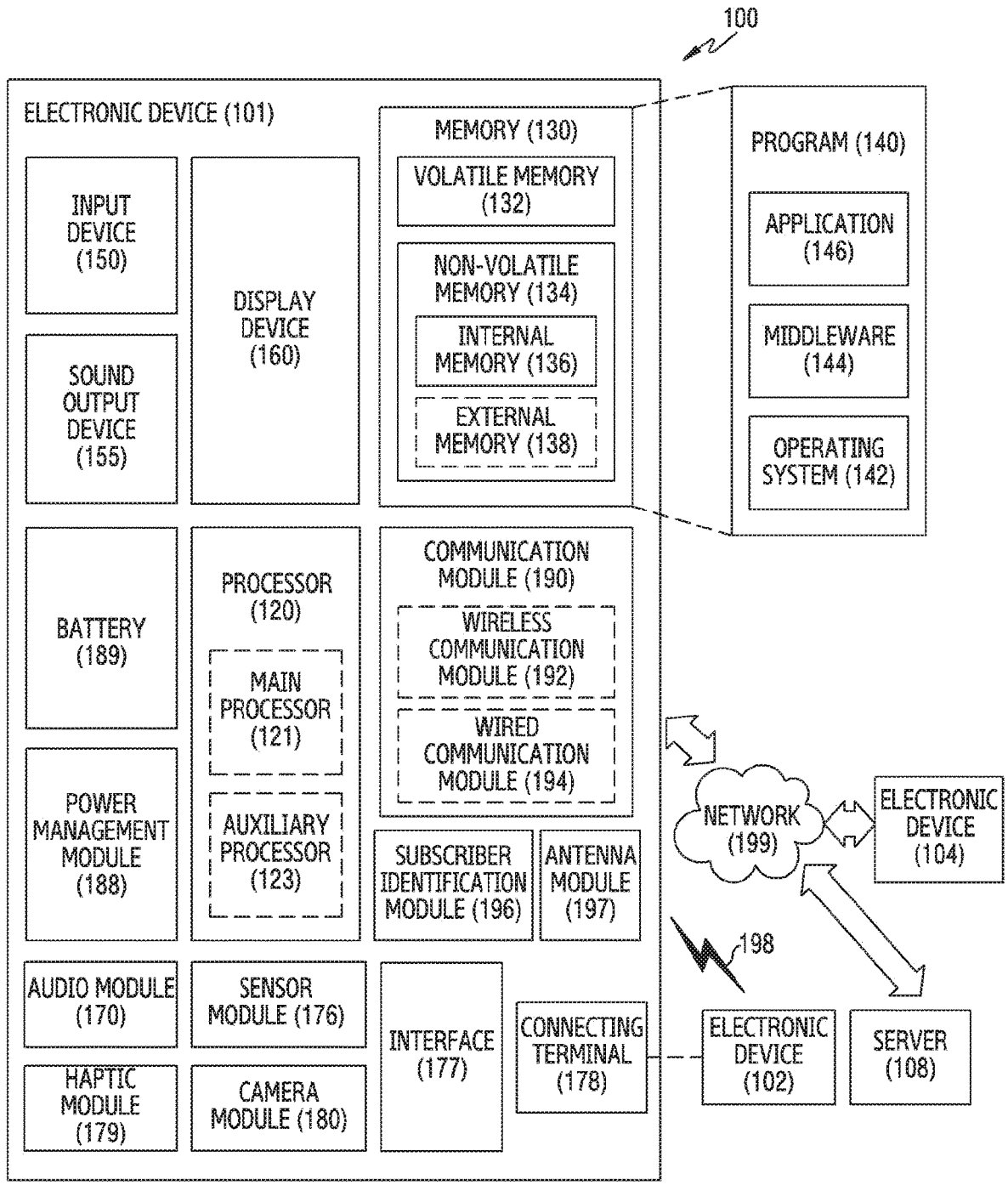
FIG. 1 is a block diagram of an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According, to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (CPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an, infrared, (IR) sensor, a biometric sensor, a temperature sensor, a humidity sensor, or an illuminance sensor.

The interface 177 may support one or more specified protocols to be used for the electronic device 101 to be coupled, with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102).

According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, mage signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently om the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various chances, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™, or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
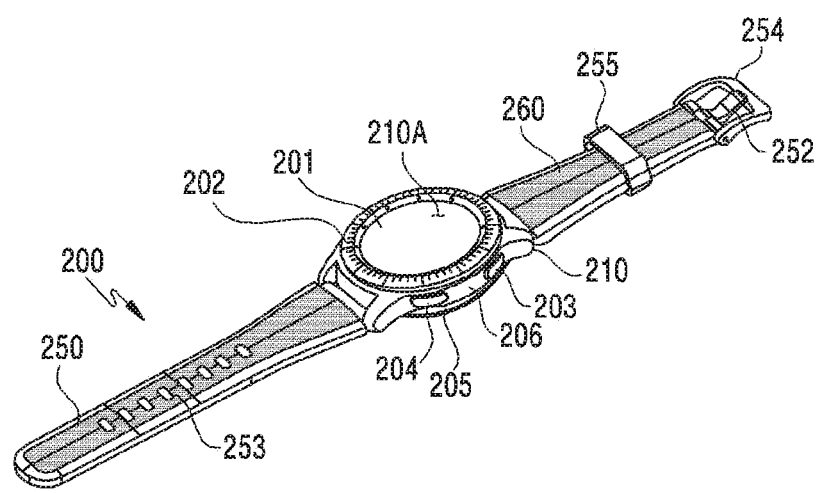
FIG. 2A is a front perspective view of a mobile electronic device according to various embodiments of the disclosure.
Figure 2B:
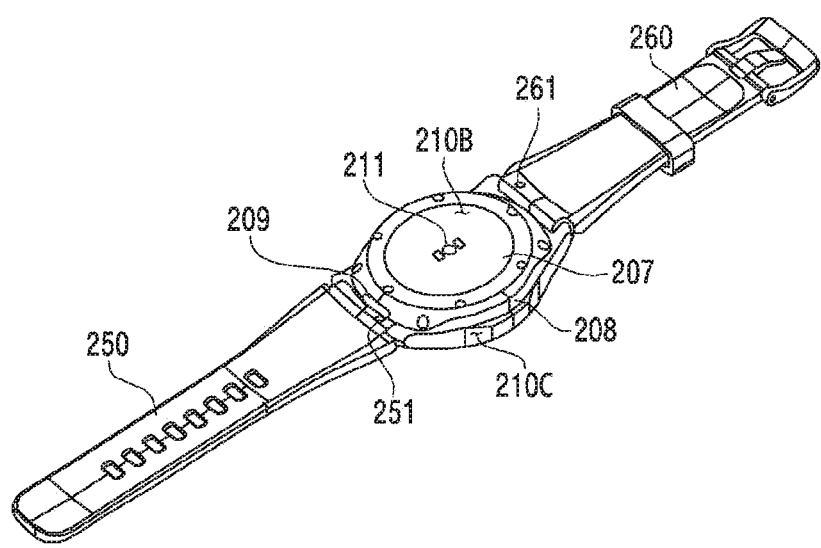
FIG. 2B is a rear perspective view of the electronic device according to various embodiments of the disclosure shown in FIG. 2A.

FIG. 2A is a front perspective view of a mobile electronic device according to various embodiments of the disclosure. FIG. 2B is a rear perspective view of the electronic device according to various embodiments of the disclosure shown in FIG. 2A.

Referring to FIG. 2A and FIG. 2B, the electronic device 100 according to an exemplary embodiment includes a first surface (or front surface) 210A, a second surface (or rear surface) 210B, and a first surface. The housing 210 including the side 210C surrounding the space between the 210A and the second surface 210B, and the electronic device 200 connected to at least a part of the housing 210 and the electronic device 200 It may include a binding member 250, 260 configured to be detachably attached to a portion (e.g., wrist, ankle, etc.). In another embodiment (not shown), the housing may refer to a structure forming some of the first surface 210A, the second surface 210B, and the side surfaces 210C of FIG. 2A. According to one embodiment, the first surface 210A may be formed by a front plate 201 (e.g., a glass plate including various coating layers, or a polymer plate) at least partially substantially transparent. The second surface 210B may be formed by a substantially opaque back plate 207. The back plate 207 is formed by, for example, coated or colored glass, ceramic, polymer, metal (e.g., aluminum, stainless steel (STS), or magnesium), or a combination of at least two of the above materials. Can be. The side surface 210C may be formed by a side bezel structure (or "side member") 206 that is coupled to the front plate 201 and the back plate 207 and includes metal and/or polymer. In some embodiments, back plate 207 and side bezel structure 206 may be integrally formed and include the same material (e.g., a metal material such as aluminum). The binding members 250 and 260 may be formed of various materials and shapes. The woven material, leather, rubber, urethane, metal, ceramic, or a combination of at least two of the above materials may be formed such that the unitary and plural unit links are flowable with each other.

According to one embodiment, the electronic device 200 includes a display 220 (referring to FIG. 3), an audio module 205, 208, a sensor module 211, key input devices 202, 203, 204, and At least one of the connector holes 209 may be included. In some embodiments, the electronic device 200 omits or other components of at least one of the components (e.g., key input devices 202, 203, 204, connector hole 209, or sensor module 211). Additional elements may be included.

The display 220 may be exposed through a significant portion of the front plate 201, for example. The shape of the display 220 may be a shape corresponding to the shape of the front plate 201, and may have various shapes such as a circular shape, an oval shape, or a polygonal shape. The display 220 may be disposed adjacent to or combined with a touch sensing circuit, a pressure sensor capable of measuring the intensity (pressure) of the touch, and/or a fingerprint sensor.

The audio modules 205 and 208 may include a microphone hole 205 and a speaker hole 208. In the microphone hole 205, a microphone for acquiring external sound may be disposed therein, and in some embodiments, a plurality of microphones may be arranged to sense the direction of sound. The speaker hole 208 can be used as an external speaker and a call receiver. In some embodiments, the speaker holes 207 and 214 and the microphone hole 203 may be implemented as one hole, or speakers may be included without the speaker holes 207 and 214 (e.g., piezo speakers).

The sensor module 211 may generate an electrical signal or data value corresponding to an internal operating state of the electronic device 200 or an external environmental state. The sensor module 211 may include, for example, a biological sensor module 211 (e.g., an HRM sensor) disposed on the second surface 210B of the housing 210. The electronic device 200 includes a sensor module (not shown), for example, a gesture sensor, a gyro sensor, an air pressure sensor, a magnetic sensor, an acceleration sensor, a grip sensor, a color sensor, an infrared (IR) sensor, a bio sensor, a temperature sensor. It may further include at least one of a humidity sensor or an illuminance sensor.

The key input devices 202, 203, and 204 are disposed on the first surface 210A of the housing 210 and are rotatable in at least one direction of the wheel key 202, and/or the housing 210. It may include side key buttons (202, 203) disposed on the side (210C). The wheel key may have a shape corresponding to the shape of the front plate 202. In another embodiment, the electronic device 200 may not include some or all of the above-mentioned key input devices 202, 203, 204, and the key input devices 202, 203, 204 not in may be displayed. On the 220, it may be implemented in other forms, such as a soft key. The connector hole 209 may accommodate a connector (e.g., a USB connector) for transmitting and receiving power and/or data to and from an external electronic device, and a connector for transmitting and receiving audio signals to and from an external electronic device. Other connector holes (not shown) may be included. The electronic device 200 may further include, for example, a connector cover (not shown) that covers at least a portion of the connector hole 209 and blocks foreign matter from entering the connector hole.

The binding members 250 and 260 may be detachably attached to at least a portion of the housing 210 by using the locking members 251 and 261. The fastening members 250 and 260 may include one or more of the fastening member 252, the fastening member fastening hole 253, the band guide member 254, and the band fastening ring 255.

The fixing member 252 may be configured to fix the housing 210 and the binding members 250 and 260 to a user's body part (e.g., wrist, ankle, etc.). The fastening member fastening hole 253 may fix the housing 210 and the fastening members 250 and 260 to a part of the user's body corresponding to the fastening member 252. The band guide member 254 is configured such that the fastening member 252 limits the range of movement of the fastening member 252 upon fastening with the fastening member fastening hole 253, so that the fastening members 250 and 260 are attached to a user's body part. It can be brought into close contact. The band fixing ring 255 may limit the range of motion of the binding members 250 and 260 while the fixing member 252 and the fixing member fastening hole 253 are fastened.

3A is an exploded perspective view of an electronic device according to various embodiments of the disclosure.

3A, the electronic device 300 includes a side bezel structure 310 (e.g., a housing or a conductive annular member), a wheel key 320, a front plate 201, a display 220, and 1 antenna 350, second antenna 355, support member 360 (e.g., bracket), battery 370, printed circuit board. 380, sealing member 390, back plate 393, and binding Members 395, 397 (or mounting members) may be included. At least one of the components of the electronic device 300 may be the same as or similar to at least one of the components of the electronic device 100 of FIG. 1 or 2, and a duplicate description will be omitted below. The support member 360 may be disposed inside the electronic device 300 to be connected to the side bezel structure 310, or may be integrally formed with the side bezel structure 310. The support member 360 may be formed of, for example, a metal material and/or a non metal (e.g., polymer) material. The support member 360 may have a display 220 coupled to one surface and a printed circuit board 380 coupled to the other surface. The printed circuit board 380 may be equipped with a processor, memory, and/or interface. The processor may include, for example, one or more of a central processing unit, an application processor, a graphic processing unit (CPU), an application processor sensor processor, or a communication processor.

The memory may include, for example, volatile memory or nonvolatile memory. The interface may include, for example, a high definition multimedia interface (HDMI), a universal serial bus (USB) interface, an SD card interface, and/or an audio interface. The interface may electrically or physically connect the electronic device 300 to an external electronic device, for example, and include a USB connector, an SD card/MMC connector, or an audio connector.

The battery 370 is a device for supplying power to at least one component of the electronic device 300, for example, a non-rechargeable primary cell, a rechargeable secondary cell, or a fuel cell It can contain. At least a portion of the battery 370 may be disposed, for example, on substantially the same plane as the printed circuit board 380. The battery 370 may be integrally disposed inside the electronic device 100 or may be detachably disposed with the electronic device 100.

The first antenna 350 may be disposed between the display 220 and the support member 360. The first antenna 350 may include, for example, a near field communication (NFC) antenna, a wireless charging antenna, and/or a magnetic secure transmission (MST) antenna. The first antenna 350 may, for example, perform short-range communication with an external device, wirelessly transmit/receive power required for charging, and transmit a self-based signal including short-range communication signals or payment data. In another embodiment, the antenna structure may be formed by a part of the side bezel structure 310 and/or the support member 360 or a combination thereof.

The second antenna 355 may be disposed between the circuit board 380 and the back plate 393. The second antenna 355 may include, for example, a near field communication (NFC) antenna, a wireless charging antenna, and/or a magnetic secure transmission (MST) antenna. The second antenna 355 may, for example, perform short-range communication with an external device, wirelessly transmit/receive power required for charging, and transmit a self-based signal including short-range communication signals or payment data. In another embodiment, the antenna structure may be formed by a side bezel structure 310 and/or a portion of the back plate 393 or a combination thereof.

The sealing member 390 may be positioned between the side bezel structure 310 and the back plate 393. The sealing member 390 may be configured to block moisture and foreign matter flowing into the space surrounded by the side bezel structure 310 and the back plate 393 from the outside.

Figure 3A:
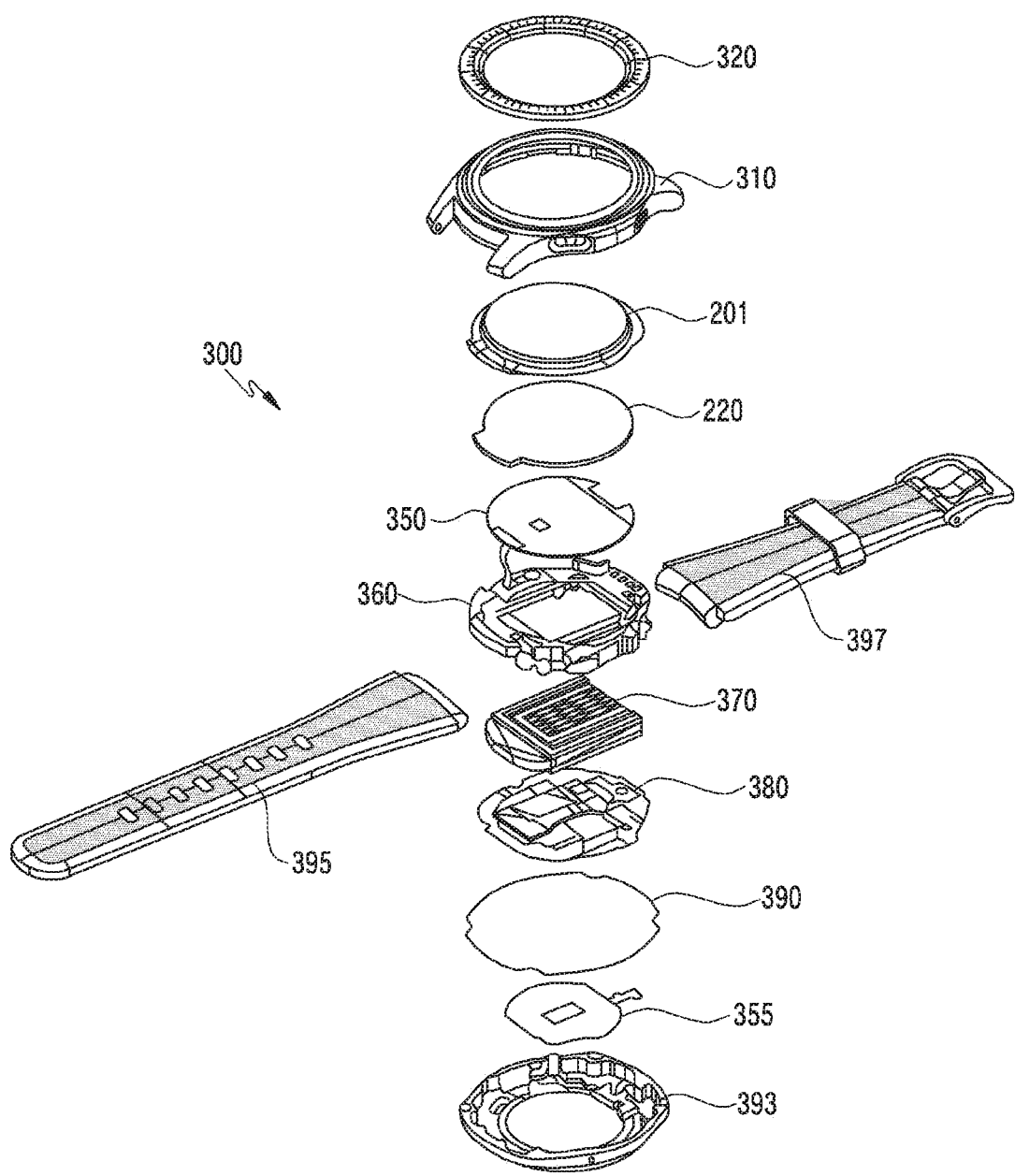
FIG. 3A is an exploded perspective view of an electronic device according to various embodiments of the disclosure.
Figure 3B:
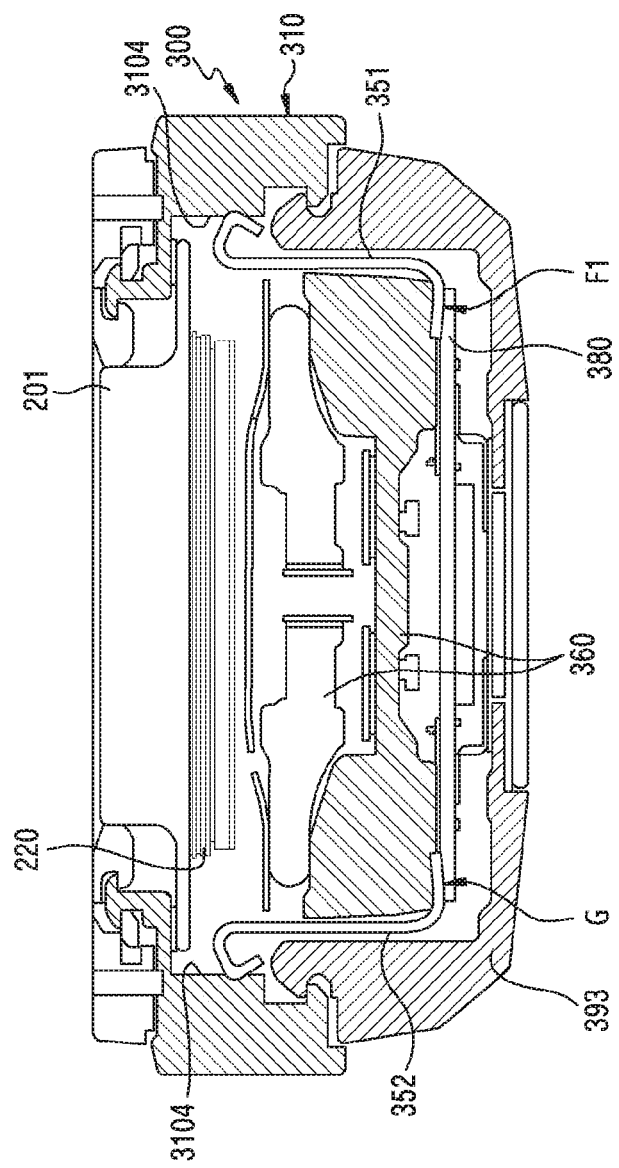
FIG. 3B is a cross-sectional view of an electronic device that shows an electrical connection state of a first feeder and a ground according to various embodiments of the disclosure.

FIG. 3B is a cross-sectional view of an electronic device that shows an electrical connection state of a first feeder and a ground according to various embodiments of the disclosure.

Referring to FIG. 3B, an electronic device 300 may be set such that a conductive annular member 310 (e.g., a side member or a side bezel structure) is electrically connected to a first feeder F1 and a ground G of a substrate 380. According to an embodiment, the first feeder F1 may be electrically connected in contact with an inner surface 3104 of the conductive annular member 310 by a first conductive connector 351 extending from the substrate 380. According to an embodiment, the ground G may be electrically connected in contact with the inner surface 3104 of the conductive annular member 310 by a second conductive connector 352 extending from the substrate 380. According to an embodiment, the conductive connectors 351 and 352 may be physically brought in contact with the inner surface 3104 of the conductive annular member 310 around or through a supporting member 360 from the substrate 380. According to an embodiment, the conductive connectors 351 and 352 may include an FPCB, a thin cable, a conductive connector, a C-clip, or the like.

According to various embodiments, the conductive annular member 310 may operate as an antenna having a radiation path corresponding to an electrical distance from the first feeder F1 to the ground G. For example, in the conductive annular member 310 having a closed loop shape, antennas may operate in different frequency bands when electrical distances from the first feeder F1 to the ground G in directions facing each other are different.

Figure 3C:
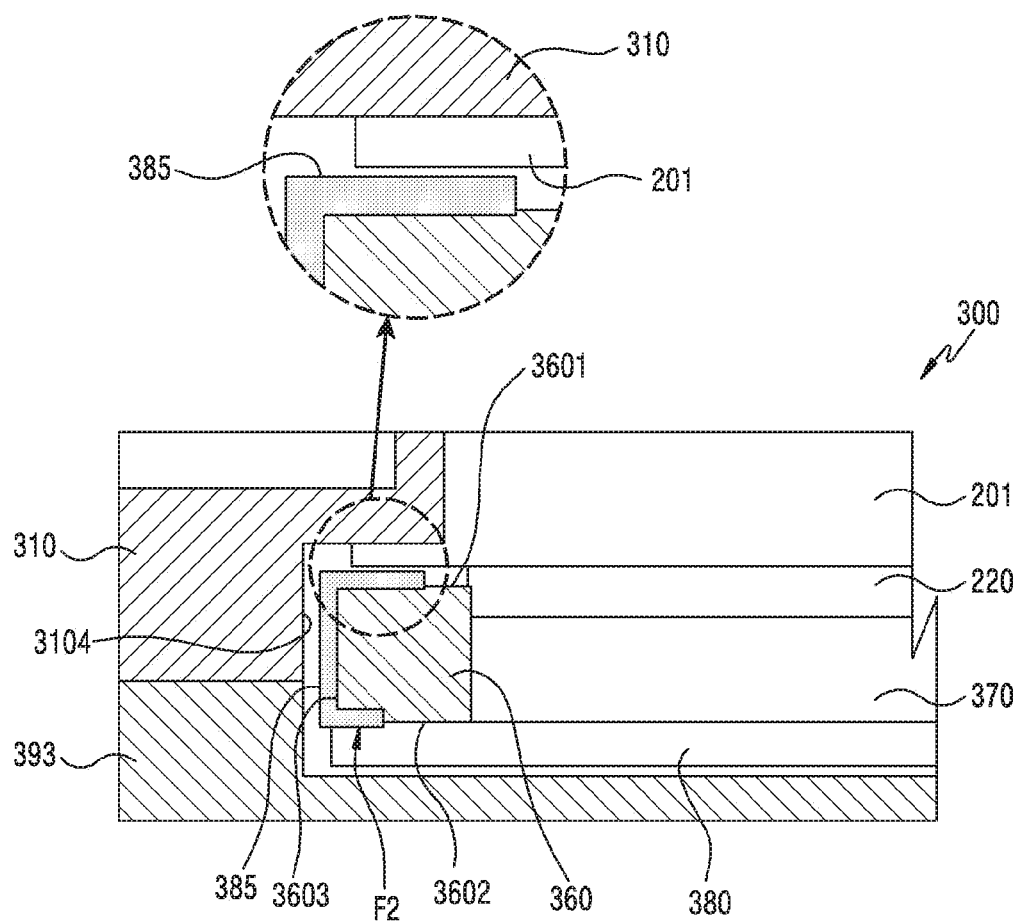
FIG. 3C is a cross-sectional view of an electronic device that shows an electrical connection state of a second feeder according to various embodiments of the disclosure.

FIG. 3C is a cross-sectional view of an electronic device that shows an electrical connection state of a second feeder according to various embodiments of the disclosure.

Referring to FIG. 3C, the electronic device 300 may include a conductive pattern. 385 disposed therein. According to an embodiment, the conductive pattern 385 may be disposed to be capacitively coupled to the inner surface 3104 of the conductive annular member 310 between a corresponding point of the conductive annular member 310 with which the first feeder F1 is in contact and a corresponding point of the conductive annular member 310 with which the ground G is in contact. According to an embodiment, the conductive pattern 385 may be electrically connected to the second feeder F2 of the substrate 380. According to an embodiment, the conductive pattern 385 may be attached to the supporting member 360. According to an embodiment, the conductive pattern 385 may be attached to the supporting member 360 of another structure disposed in the conductive annular member 310 in a Laser Direction. Structuring (LDS), Thin Film Antenna (TEA), Flexible Printed Circuit Board (FPCB), or Steel Use Stainless (SUS) type. According to an embodiment, the conductive pattern 385 may be disposed around or through the supporting member 360.

According to various embodiments, at least a portion (e.g., a radiating portion) of the conductive pattern 385 may be disposed at a position where it can be coupled to the inner surface 3104 of the conductive annular member 310. According to an embodiment, at least a portion of the conductive pattern 385 may be disposed in at least a portion of a Black Matrix (BM) region of the display 220 between the front plate 201 and the supporting member 360. According to an embodiment, at least a portion of the conductive pattern may be disposed between the conductive annular member 310 and the supporting member 360. According to an embodiment, at least a portion of the conductive pattern 385 may be disposed to extend from between the front plate 2101 and the supporting member 360 to between the conductive annular member 310 and the supporting member 360.

Figure 3D:
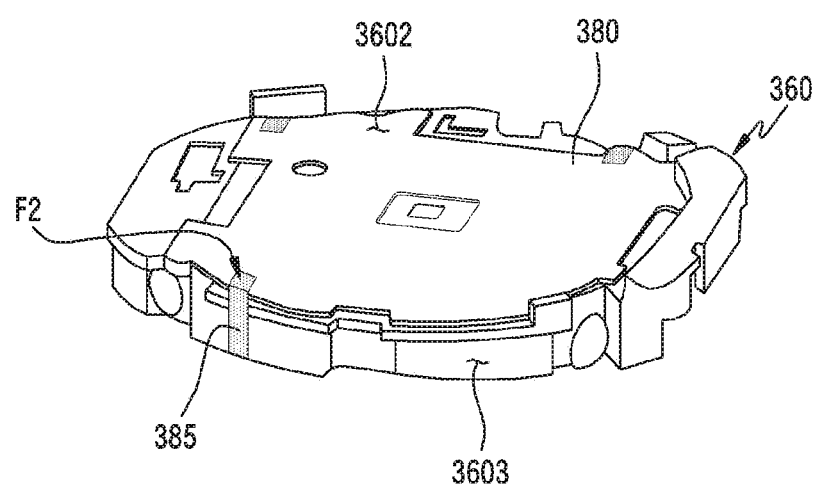
FIGS. 3D and 3D are views showing a supporting member including a conductive pattern according to various embodiments of the disclosure.
Figure 3E:
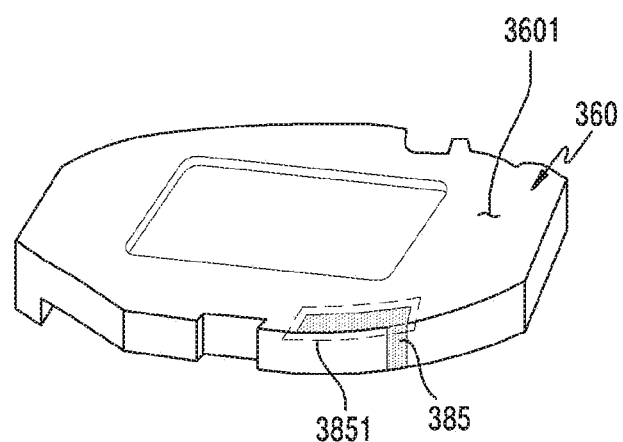

FIGS. 3D and 3E are views showing a supporting member including a conductive pattern according to various embodiments of the disclosure and FIG. 3D is a view showing the supporting member including a conductive pattern according to various embodiments of the disclosure.

Referring to FIGS. 3D and 3D, the supporting member 360 may have a first surface 3601 facing a first direction (e.g., the direction facing the front late 201 in FIG. 3A), a second surface 3602 facing a second direction (e.g., the direction facing the rear plate 393 in FIG. 3B) opposite to the first direction, and a side 3603 disposed to surround the space between the first surface 3601 and the second surface 3602. According to an embodiment, the supporting member 360 may be disposed such that the first surface 3601 supports a display (e.g., the display 220 shown in FIG. 3C) and the second surface 3602 supports a substrate (e.g., the substrate 380 shown in FIG. 3C). According to an embodiment, the conductive pattern 385 may be electrically connected to the second feeder F2 disposed on the substrate 380 and may be disposed up to at least a partial region of the first surface 3601 of the supporting member 360 around the side 3603 of the supporting member 360. According to an embodiment, the radiating portion 3851 of the conductive pattern 385 may be capacitively coupled to the inner surface of a conductive annular member (e.g., the conductive annular member 310 shown in FIG. 3D) on the first surface 3601 and the side 3603 of the supporting member 360. However, the disclosure is not limited thereto and the radiating portion 3851 may be disposed on the side 3603 or the first surface 3601 of the supporting member 360 as long as it is disposed at a position where it can be coupled to the conductive annular member 310.

Figure 4A:
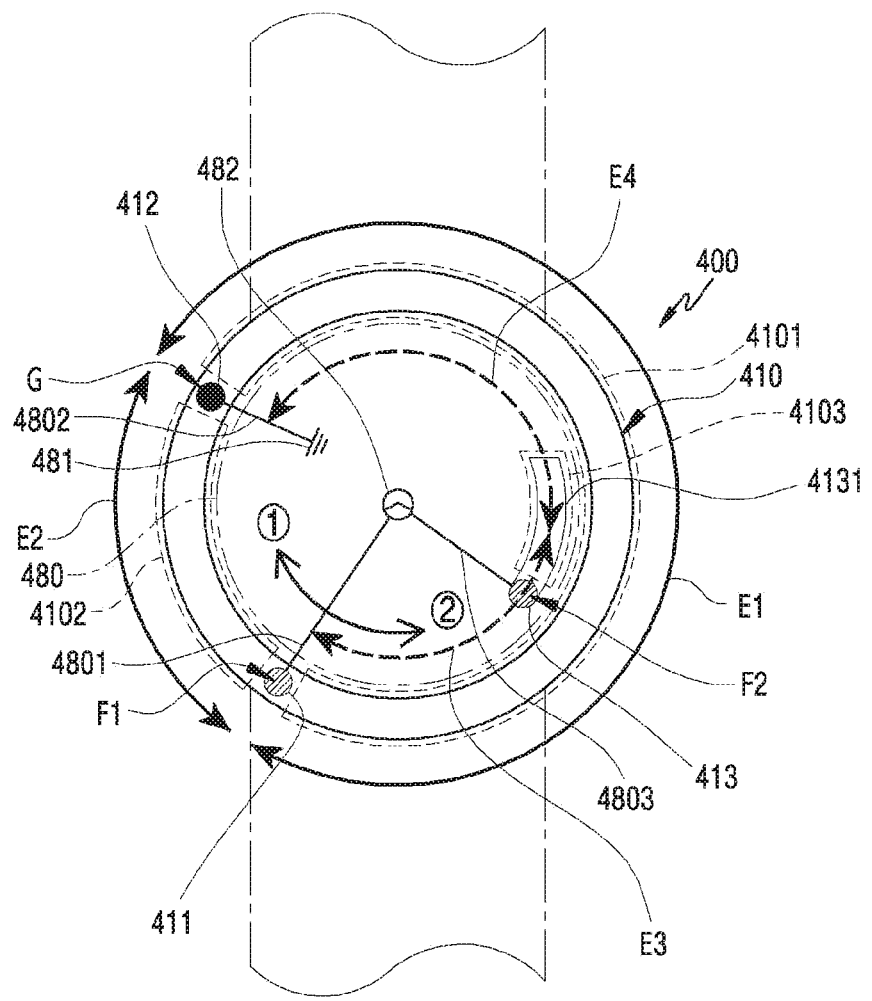
FIG. 4A is a view showing the configuration of an electronic device including an antenna according to various embodiments of the disclosure.
Figure 4B:
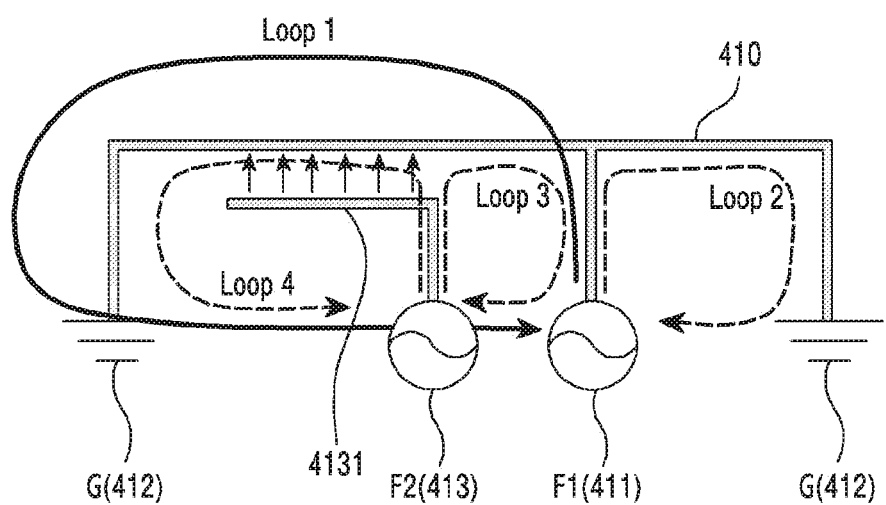
FIG. 4B is a view showing radiation paths of an electronic device according to various embodiments of the disclosure.

FIG. 4A is a view showing the configuration of an electronic device including an antenna according to various embodiments of the disclosure. FIG. 4B is a view showing radiation paths of an electronic device according to various embodiments of the disclosure.

The electronic device 400 shown in FIG. 4A may be at least partially similar to the electronic device 101 shown in FIG. 1, the electronic device 200 shown in FIG. 2A, or the electronic device 300 shown in FIG. 3A, or may include other embodiments of electronic devices.

Referring to FIG. 4A, the electronic device 400 may include a conductive annular member 410 (e.g., the side bezel structure 310 shown in FIG. 3A or a side structure) at least partially made of a conductive material and having a closed loop. According to an embodiment, the electronic device 400 may include a first feeder F1 electrically connected with a wireless communication circuit 482 (e.g., the wireless communication module 192 shown in FIG. 1) of a substrate 480 (e.g., the substrate 380 shown in FIG. 3D) at a first point 411 of the conductive annular member 410 through a first electrical path 4801. According to an embodiment, the electronic device 400 may include a ground G electrically connected with a ground plane 481 (e.g., a grounding region) of the substrate 480 (e.g., the substrate 380 shown in FIG. 3A) through a second electrical path 4802 at a second point 412 spaced a predetermined distance apart from the first point 411 of the conductive annular member 410 in a predetermined direction (e.g., the direction $\hat{1}$). According to an embodiment, the electronic device 400 may include a second feeder F2 electrically connected with the wireless communication circuit 482 of the substrate 480 (e.g., the substrate 380 shown in FIG. 3C) through a third electrical path 4803 at a third point 413 spaced a predetermined distance from the first point 411 of the conductive annular member 410 in the opposite direction (e.g., the direction $\hat{2}$) to the predetermined direction. According to an embodiment, the electronic device 400 may include a conductive pattern 4131. According to an embodiment, a first region 4101 of the conductive annular member 410 defined between the first point 411 and the second point 412 may be set to have a first length E1 and a second region 4102 of the conductive annular member 410 defined between the first point 411 and the second point 412 may be set to have a second length E2 smaller than the first length E1. According to an embodiment, the first feeder F1 and the ground G may be connected from the substrate 480 (e.g., the substrate 380 shown in FIG. 3D) to the inner surface of the conductive annular member 410 (e.g., the inner surface 3104 shown in FIG. 3B) by electrical connection members (e.g., the conductive connectors 351 and 352 shown in FIG. 3B). According to an embodiment, the second feeder F2 may be formed such that a conductive pattern 4131 disposed to be able to be coupled to the conductive annular member 410 and the substrate 480 (e.g., the substrate 380 shown in FIG. 3C) are electrically connected in the conductive annular member 410. According to an embodiment, the conductive pattern 4131 may have an extension 4103 (e.g., a radiating portion) extending along at least a portion of the first region 4101.

According to various embodiments, the conductive annular member 410 can operate as a first antenna using the first feeder F1 and the ground. G. According to an embodiment, conductive annular member 410 can operate as a first antenna having a first electrical length E1 defined from the first point 411 to the second point 412 in the direction $\hat{2}$ and a second electrical length E2 defined from the first point 411 to the second point 412 in the direction $\hat{2}$. According to an embodiment, the conductive pattern 4131 can operate as a second antenna having a third electrical length E3 defined from the third point 413 to the first point 411 in the direction $\hat{1}$ and a fourth electrical length E4 defined from the third point 413 to the second point 412 in the direction $\hat{2}$.

Referring to FIG. 4B, the first antenna can operate in different frequency bands by a first radiation path (loop 1) having the first electrical length E1 corresponding to the first region 4101 of the conductive annular member 410 and a second radiation path (loop 2) having the second electrical length E2 corresponding to the second region 4102 of the conductive annular member 410. For example, the first antenna may operate in a low band (e.g., 700 MHz~900 MHz) using the first radiation path (loop 1) and in a mid band (e.g., 1700 MHz~2100 MHz) using the second radiation band (loop 2).

According to various embodiments, the second antenna is disposed along at least a portion of the first region 4101 in the housing between the ground G and the first feeder F1 and can operate in different frequency bands by a third radiation path (loop 3) having a third electrical length E3 from a portion of the extension 4103 of the conductive pattern 4131 to the first point 411 of the conductive annular member 410 and a fourth radiation path (loop 4) having a fourth electrical length E4 from a portion of the extension 4103 of the conductive pattern 4131 to the second point 412 of the conductive annular member 410. For example, the second antenna can operate in a high band (e.g., 2300 MHz~2700

MHz) using the third radiation path (loop 3). According to an embodiment, a frequency using the fourth radiation path (loop 4) may be a frequency that does not influence the first antenna.

According to various embodiments, since the electronic device 400 includes the second antenna implemented by the conductive pattern 4131 disposed to be coupled to the conductive annular member 410 operating as the first antenna, it can operate as an antenna in another band (e.g., a high band) without influencing the radiation performance of the conductive annular member 410. According to an embodiment, since the conductive pattern 4131 operating in a high band is coupled to the conductive annular member 410, deterioration of the radiation performance may be reduced even if a human body comes close to the conductive annular member 410.

Figure 5:
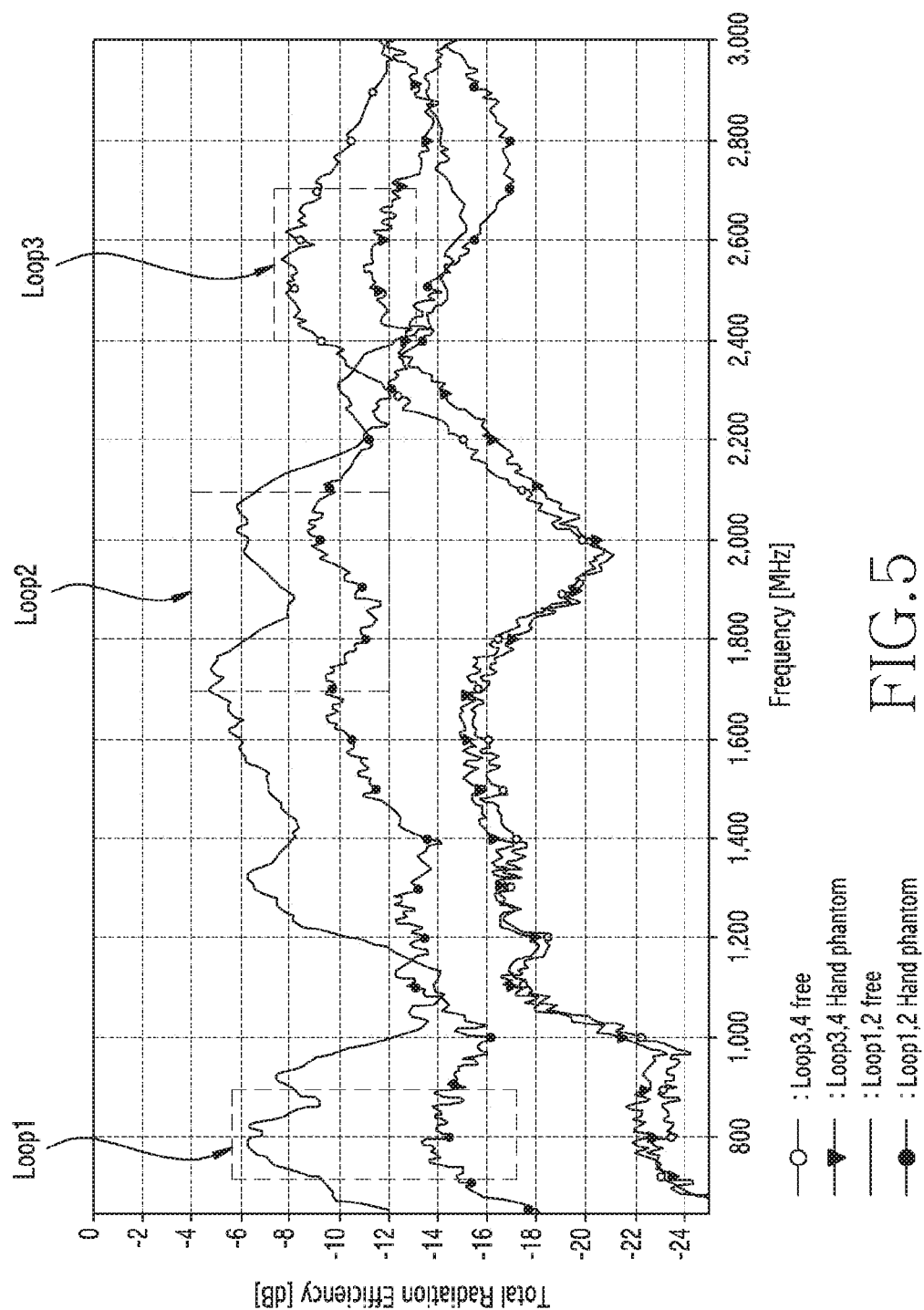
FIG. 5 is a graph comparing radiation efficiencies of antennas of an electronic device according to various embodiments of the disclosure.

FIG. 5 is a graph comparing radiation efficiencies of antennas of an electronic device according to various embodiments of the disclosure, which shows the state in which the radiation performance of an antenna is deteriorated by a hand phantom.

Referring to FIG. 5, it can be seen that when a conductive pattern (e.g., the conductive pattern 4131 shown in FIG. 4A) is disposed to be coupled to a housing (e.g., conductive annular member 410 shown in FIG. 4A) and is electrically connected with a wireless communication circuit, a loss of 3 dB from −8 dB to −11 dB is generated in a high band (loop 3) by a hand phantom. Accordingly, it can be seen that the loss width is relatively reduced in comparison to that efficiency is generally decreased over 10 dB by a hand phantom in electronic devices.

Figure 6A:
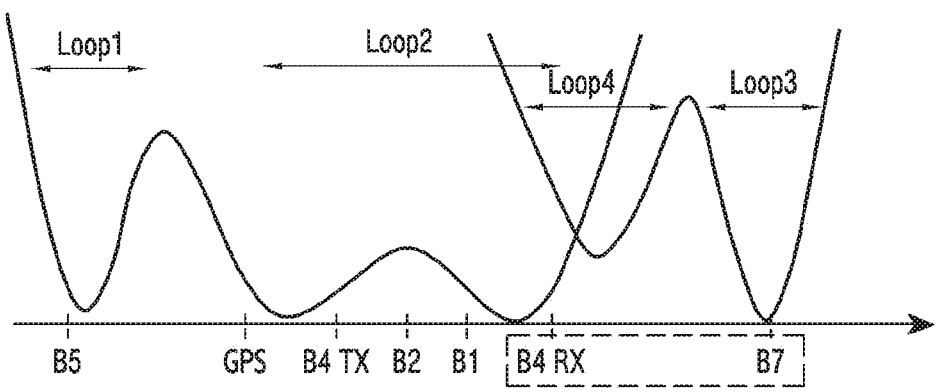
FIG. 6A is a graph showing an operation frequency of an antenna according to various embodiments of the disclosure.

FIG. 6A is a graph showing an operation frequency of an antenna according to various embodiments of the disclosure FIG. 6B is a schematic block diagram of a diversity antenna related to the graph shown in FIG. 6A according to various embodiments of the disclosure.

Referring to FIG. 6A, it may be used as a diversity antenna by switching a mid band, which uses a radiation path (e.g., the second radiation path (loop 2) shown in FIG. 4B) corresponding to the electrical length (e.g., the first electrical length. E1 shown in FIG. 4A) from a first point (e.g., the first point 411 shown in FIG. 4A) of a conductive annular member (e.g., the conductive annular member 410 shown in FIG. 4A) to a second point (e.g., the second point 412 shown in FIG. 4A) in the direction 1̂ shown in FIG. 4A, and a portion of a frequency that uses a conductive pattern (e.g., the conductive pattern 4131 shown in FIG. 4A).

For example, as shown in FIG. 6B, a second antenna A2 can generate a resonance frequency even in B4 Rx that is the operation frequency of a first antenna A1, by adjusting the electrical length of a fourth radiation path (loop 4) and using a switching device and a filter (R$^l$ saw), so it can operate as a diversity antenna in B4 Rx instead of B7.

Figure 7A:
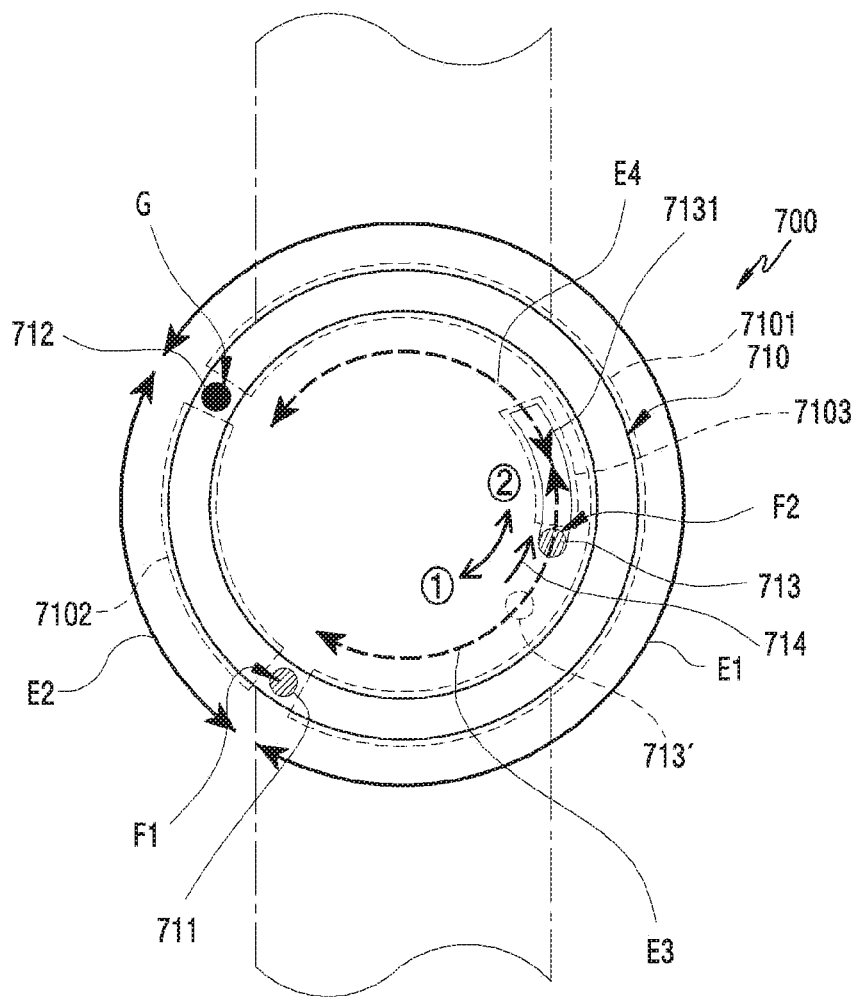
FIG. 7A is a view showing the configuration of an electronic device including an antenna according to various embodiments of the disclosure.
Figure 7B:
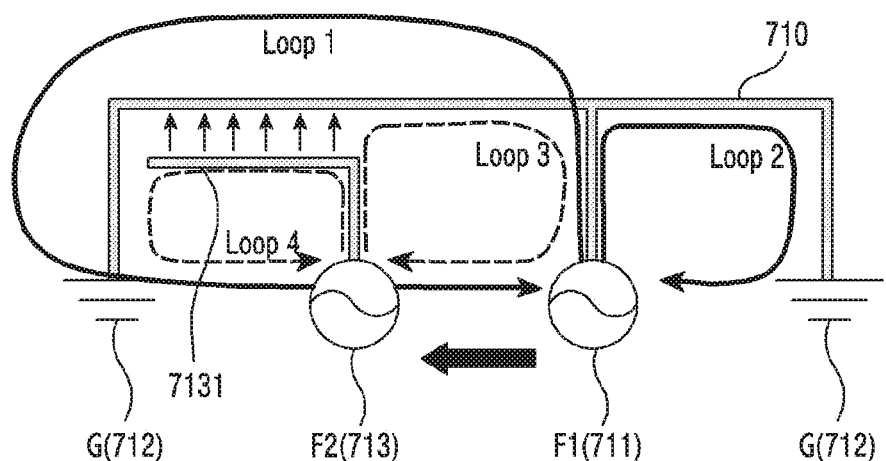
FIG. 7B is a view showing radiation paths or an electronic device according to various embodiments of the disclosure.
Figure 8:
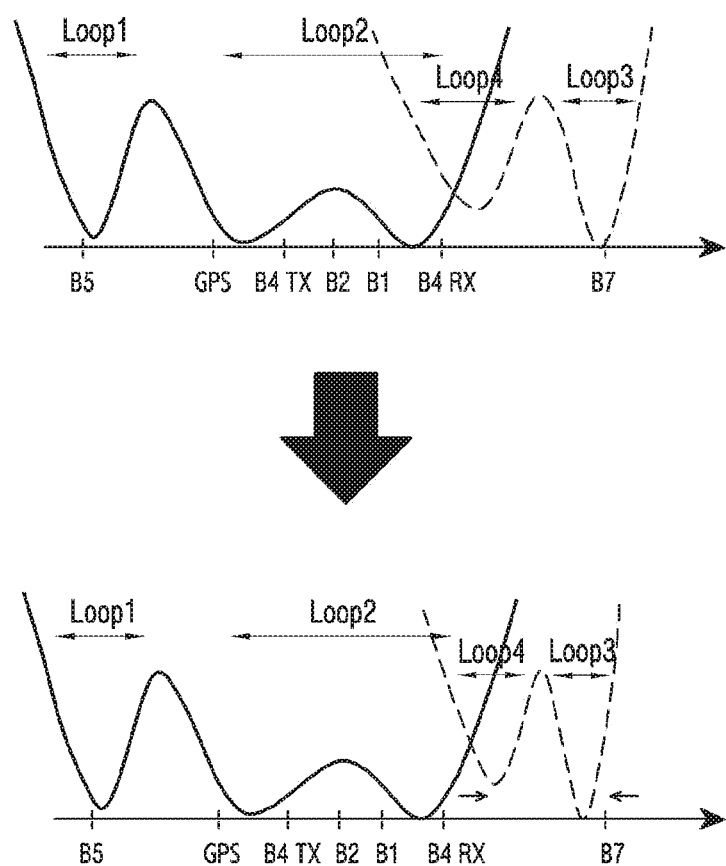
FIG. 8 is a graph showing an operation frequency band of the antenna shown in FIG. 7A according to various embodiments of the disclosure.

FIG. 7A is a view showing the configuration of an electronic device including an antenna according to various embodiments of the disclosure. FIG. 7B is a view showing radiation paths of an electronic device according to various embodiments of the disclosure. FIG. 8 is a graph showing an operation frequency band of the antenna shown in FIG. 7A according to various embodiments of the disclosure.

The electronic device 700 shown in FIG. 7A may be at least partially similar to the electronic device 101 shown in FIG. 1, the electronic device 200 shown in FIG. 2A, or the electronic device 300 shown in FIG. 3A, or may include other embodiments of electronic devices.

Referring to FIG. 7A, the electronic device 700 may include a first feeder F1 electrically connected with a wireless communication circuit of a substrate (e.g., the substrate 380 shown in FIG. 3D) at a first point 711 of a conductive annular member 710, a ground G electrically connected with a grounding region of the substrate (e.g., the substrate 380 shown in FIG. 3D) at a second point 712 spaced a predetermined distance apart from the first point 711 of the conductive annular member 710 in a predetermined direction (e.g., the direction 1̂), a second feeder F2 electrically connected with the wireless communication circuit of the substrate (e.g., the substrate 380 shown in FIG. 3C) at a third point 713 spaced a predetermined distance apart from the first point 711 of the conductive annular member 710 in the opposite direction (the direction 2̂) to the predetermined direction, and a conductive pattern 7131. According to an embodiment, a first region 7101 of the conductive annular member 710 defined between the first point 711 and the second point 712 may be set to have a first length E1 and a second region 7102 of the conductive annular member 710 defined between the first point 711 and the second point 712 may be set to have a second length E2 smaller than the first length E1. According to an embodiment, the conductive pattern 7131 may have an extension 7103 (e.g., a radiating portion) extending along at least a portion of the first region 7101.

According to various embodiments, the conductive annular member 710 may operate as a first antenna using the first feeder F1 and the ground G. According to an embodiment, the conductive annular member 710 can operate as a first antenna having a first electrical length E1 defined from the first point 711 to the second point 712 in the direction 2̂ and a second electrical length E2 defined from the first point 711 to the second point 712 in the direction 1̂. According to an embodiment, the conductive pattern 4131 can operate as a second antenna having a third electrical length E3 defined from a portion of the extension 7103 to the first point 711 in the direction 1̂ and a fourth electrical length E4 defined from a portion of the extension 7103 to the second point 712 in the direction 2̂.

Referring to FIG. 7B, the first antenna can operate in different frequency bands by a first radiation path (loop 1) having the first electrical length E1 corresponding to a first region 7101 of the conductive annular member 710 and a second radiation path (loop 2) having the second electrical length E2 corresponding to a second region 7102 of the conductive annular member 710. According to an embodiment, the second antenna is disposed along at least a portion of the first region 7101 and can operate in different frequency bands by a third radiation path (loop 3) having a third electrical length E3 from a portion of the extension 7103 of the conductive pattern 7131 to the first point 711 of the conductive annular member 710 and a fourth radiation path (loop 4) having a fourth electrical length E4 from a portion of the extension 7103 of the conductive pattern 7131 to the second point 712 of the conductive annular member 710.

According to various embodiments, the operation band of a second antenna operating through the conductive pattern 7131 may be moved or the operation frequency band may be increased or decreased by changing the third point 713 where the conductive pattern 7131 is powered. According to an embodiment, the third point 713 of the conductive pattern 7131 may be moved by a predetermined distance 714 from the initial position 713' in the direction 2̂.

For example, in this case, the third electrical length E3 may increase and the fourth electrical length E4 may decrease. Referring to FIG. 8, it can be seen that the operation frequency band of the operation frequency band by the conductive pattern 7131 including the third radiation path (loop 3) corresponding to the third electrical length E3 and the fourth radiation path (loop 4) corresponding to the fourth electrical length E4 relatively decreases, the operation frequency through the third radiation path (loop 3) moves to a high frequency band, and the operation frequency through the fourth radiation path (loop 4) moves the a low frequency band.

Figure 9A:
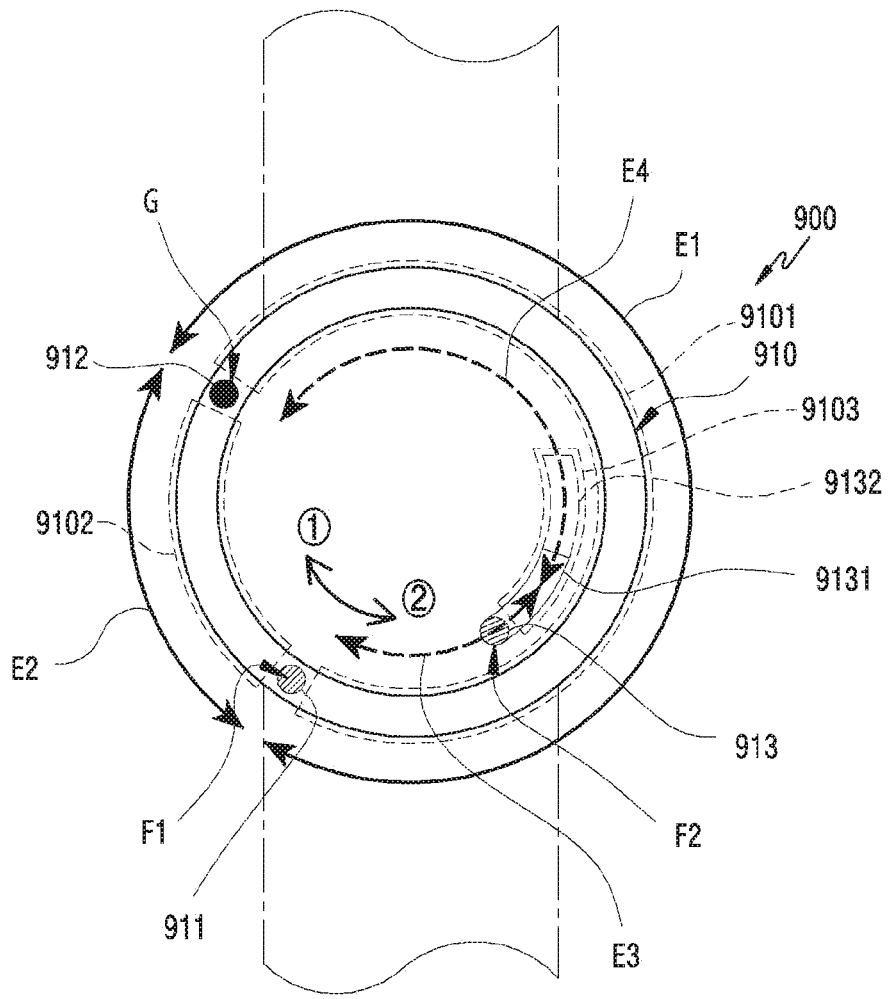
FIG. 9A is a view showing the configuration of an electronic device including an antenna according to various embodiments of the disclosure.
Figure 9B:
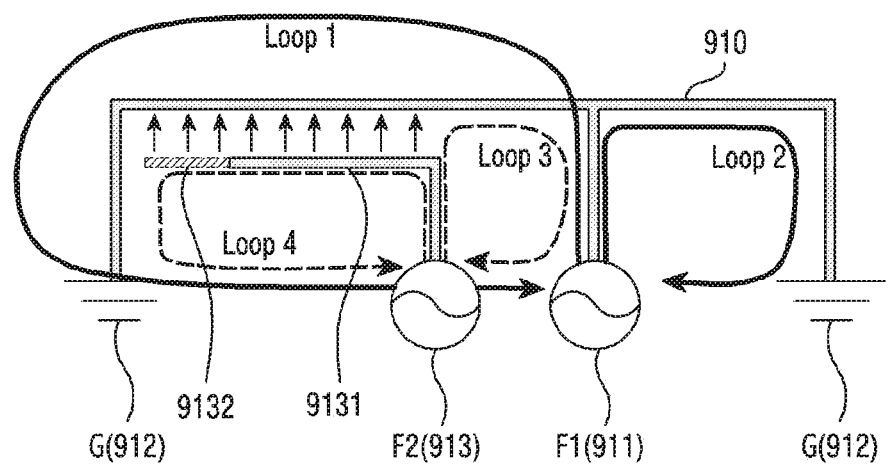
FIG. 9B is a view showing radiation paths of an electronic device according to various embodiments of the disclosure.

FIG. 9A is a view showing the configuration of an electronic device including an antenna according to various embodiments of the disclosure. FIG. 9B is a view showing radiation paths of an electronic device according to various embodiments of the disclosure.

The electronic device 900 shown in FIG. 9A may be at least partially similar to the electronic device 101 shown in FIG. 1, the electronic device 200 shown in FIG. 2A, or the electronic device 300 shown in FIG. 3A, or may include other embodiments of electronic devices.

Referring to FIG. 9A, the electronic device 900 may include a first feeder F1 electrically connected with a wireless communication circuit of a substrate (e.g., the substrate 380 shown in FIG. 3B) at a first point 911 of a conductive annular member 910, a ground G electrically connected with a grounding region of the substrate (e.g., the substrate 380 shown in FIG. 3B) at a second point 912 spaced a predetermined distance apart from the first point 911 of the conductive annular member 910 in a predetermined direction (e.g., the direction $\hat{1}$, a second feeder F2 electrically connected with the wireless communication circuit of the substrate (e.g., the substrate 380 shown in FIG. 3C) at a third point 913 spaced a predetermined distance apart from the first point 911 of the conductive annular member 910 in the opposite direction (the direction $\hat{2}$) to the predetermined direction, and a conductive pattern 9131. According to an embodiment, a first region 9101 of the conductive annular member 910 defined between the first point 911 and the second point 912 may be set to have a first length E1 and a second region 9102 of the conductive annular member 910 defined between the first point 911 and the second point 912 may be set to have a second length E2 smaller than the first length E1. According to an embodiment, the conductive pattern 9131 may have an extension 9103 (e.g., a radiating portion) extending along at least a portion of the first region 9101.

According to various embodiments, the conductive annular member 910 may operate as a first antenna using the first feeder F1 and the ground G. According to an embodiment, the conductive annular member 910 can operate as a first antenna having a first electrical length E1 defined from the first point 911 to the second point 912 in the direction $\hat{2}$ and a second electrical length E2 defined from the first point 911 to the second point 912 in the direction $\hat{1}$. According to an embodiment, the conductive pattern 9131 can operate as a second antenna having a third electrical length E3 defined from a portion of the extension 9103 to the first point 911 in the direction $\hat{1}$ and a fourth electrical length E4 defined from a portion of the extension 9103 to the second point 912 in the direction $\hat{2}$.

Referring to FIG. 9B, the first antenna can operate in different frequency bands by first radiation path (loop 1) having the first electrical length E1 corresponding to a first region 9101 of the conductive annular member 910 and a second radiation path (loop 2) having the second electrical length E2 corresponding to a second region 9102 of the conductive annular member 910. According to an embodiment, the second antenna is disposed along at least a portion of the first region 9101 and can operate in different frequency bands by a third radiation path (loop 3) having a third electrical length E3 from a portion of the extension 9103 of the conductive pattern 9131 to the first point 911 of the conductive annular member 910 and a fourth radiation path (loop 4) having a fourth electrical length E4 from a portion of the extension 9103 of the conductive pattern 9131 to the second point 912 of the conductive annular member 910.

According to various embodiments, the operation frequency band of the second antenna operating through the extension 9103 of the conductive pattern 9131 may be moved by changing the length of the conductive pattern 9131. According to an embodiment, the conductive pattern 9131 may include an additional pattern 9132 extending from an end. According to an embodiment, the additional pattern 9132 may be disposed to be coupled to the conductive annular member 910.

Figure 10A:
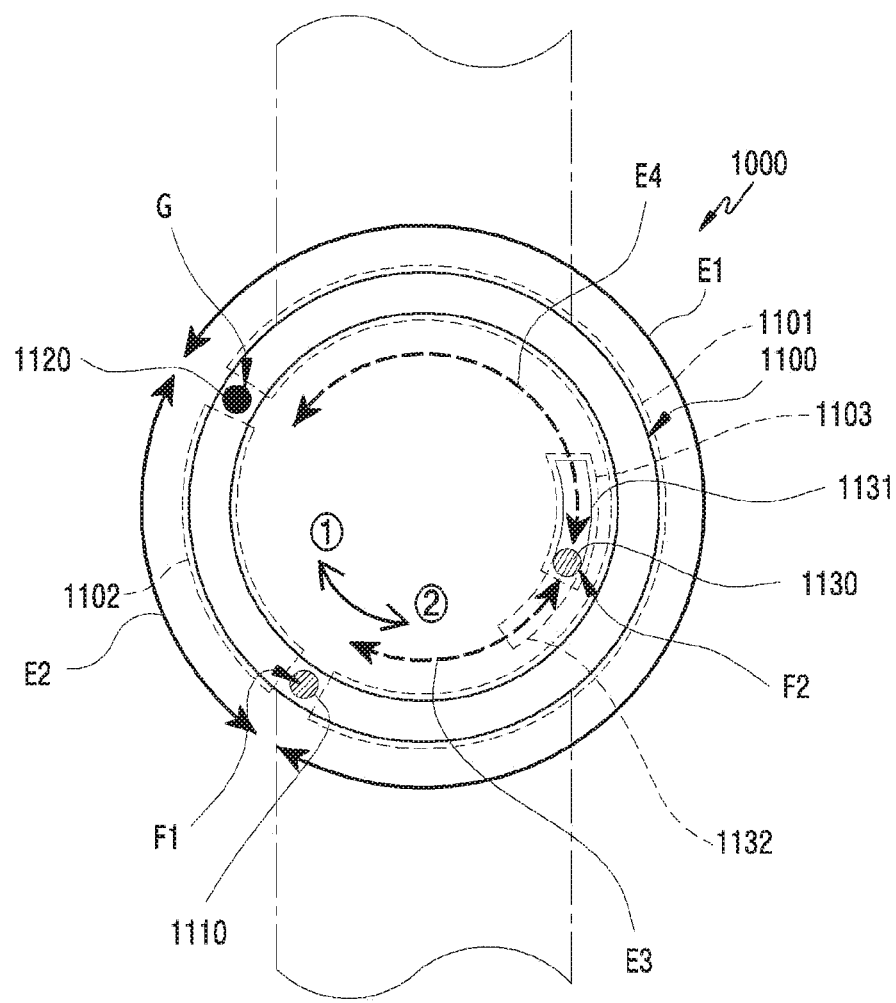
FIG. 10A is a view showing the configuration of an electronic device including an antenna according to various embodiments of the disclosure.
Figure 10B:
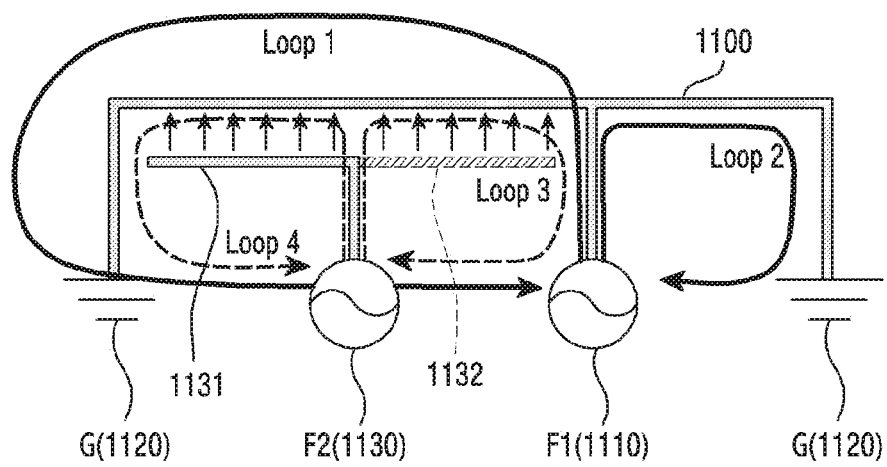
FIG. 10B is a view showing radiation paths of an electronic device according to various embodiments of the disclosure.

FIG. 10A is a view showing the configuration of an electronic device including an antenna according to various embodiments of the disclosure. FIG. 10B is a view showing radiation paths of an electronic device according to various embodiments of the disclosure.

The electronic device 1000 shown in FIG. 10A may be at least partially similar to the electronic device 101 shown in FIG. 1, the electronic device 200 shown in FIG. 2A, or the electronic device 300 shown in FIG. 3A, or may include other embodiments of electronic devices.

Referring to FIG. 10A, the electronic device 1000 may include a first feeder F1 electrically connected with a wireless communication circuit of a substrate (e.g., the substrate 380 shown in FIG. 3D) at a first point 1110 of a conductive annular member 1100, a ground G electrically connected with a grounding region of the substrate (e.g., the substrate 380 shown in FIG. 3B) at a second point 1120 spaced a predetermined distance apart from the first point 1110 of the conductive annular member 1100 in a predetermined direction (e.g., the direction $\hat{1}$), a second feeder F2 electrically connected with the wireless communication circuit of the substrate (e.g., the substrate 380 shown in FIG. 3C) at a third point 1130 spaced a predetermined distance apart from the first point 1110 of the conductive annular member 1100 in the opposite direction (the direction $\hat{2}$) to the predetermined direction, and a conductive pattern 1131. According to an embodiment, a first region 1101 of the conductive annular member 1100 defined between the first point 1110 and the second point 1120 may be set to have a first length E1 and a second region 1102 of the conductive annular member 1100 defined between the first point 1110 and the second point 1120 may be set to have a second length E2 smaller than the first length E1. According to an embodiment, the conductive pattern 1131 may have an extension 1103 (e.g., a radiating portion) extending along at least a portion of the first region 1101.

According to various embodiments, the conductive annular member 1100 may operate as a first antenna using the first feeder F1 and the ground G. According to an embodiment, the conductive annular member 1100 can operate as a first antenna having a first electrical length E1 defined from the first point 1110 to the second point 1120 in the direction $\hat{2}$ and a second electrical length E2 defined from the first point 1110 to the second point 1120 in the direction $\hat{1}$. According to an embodiment, the conductive pattern 1131 can operate as a second antenna having a third electrical length E3 defined from a portion of the extension 1103 to the first point 1110 in the direction $\hat{1}$ and a fourth electrical length E4 defined from a portion of the extension 1103 to the second point 1120 in the direction $\hat{2}$.

Referring to FIG. 10B, the first antenna ban operate in different frequency bands by a first radiation path (loop 1) having the first electrical length E1 corresponding to a first region 1101 of the conductive annular member 1100 and a second radiation path (loop 2) having the second electrical length E2 corresponding to a second region 1102 of the conductive annular member 1100. According to an embodiment, the second antenna is disposed along at least a portion of the first region 1101 and can operate in different frequency bands by a third radiation path (loop 3) having a third electrical length E3 from a portion of the extension 1103 of the conductive pattern 1131 to the first point 1110 of the conductive annular member 1100 and a fourth radiation path (loop 4) having a fourth electrical length E4 from a portion of the extension 1103 of the conductive pattern 1131 to the second point 1120 of the conductive annular member 1100.

According to various embodiments, the operation frequency band of the second antenna operating through the conductive pattern 1131 may be moved by changing the length of the conductive pattern 1131. According to an embodiment, the conductive pattern 1131 may include an additional pattern 1132 extending in the direction 1̂ such that the length of the conductive pattern 1131 increases. According to an embodiment, the additional pattern 1132 may be disposed to be coupled to the conductive annular member 1100.

Figure 11:
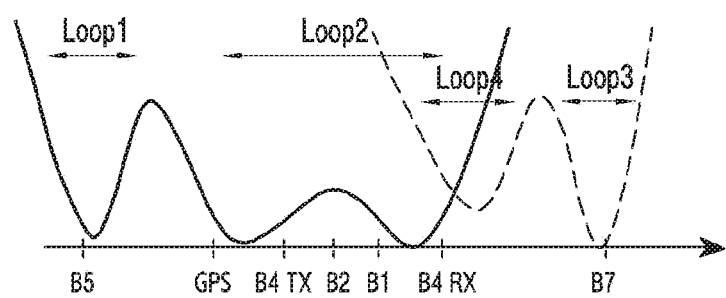
FIG. 11 is a graph showing an operation frequency of the antenna shown in FIGS. 9A and 10A according to various embodiments of the disclosure.
Figure 11:
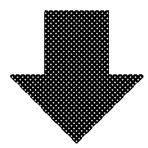
Figure 11:
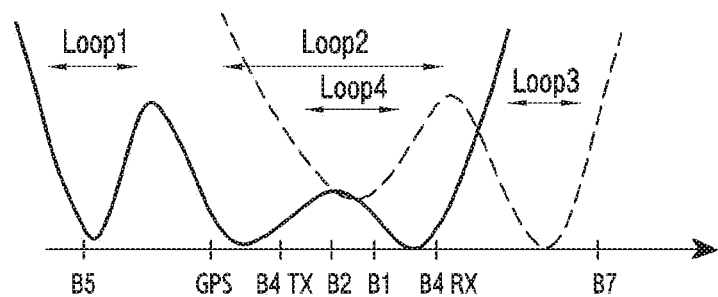

FIG. 11 is a graph showing an operation frequency of the antenna shown in FIGS. 9A and 10A according to various embodiments of the disclosure, in which, as the cases in FIGS. 9A to 10B, when the length of the conductive patterns 9131 and 1131 coupled to the conductive annular members 910 and 1100 increases, the area coupled to the conductive annular members 910 and 1100 increases, so the capacitance increases. Accordingly, the operation frequency band by the conductive patterns 9131 and 1131 including a third radiation path (loop 3) corresponding to a third electrical length E3 and a fourth radiation path (loop 4) corresponding to a fourth electrical length E4 can be shifted from a high frequency band to a low frequency band and the operation frequency band can also be increased.

Figure 12A:
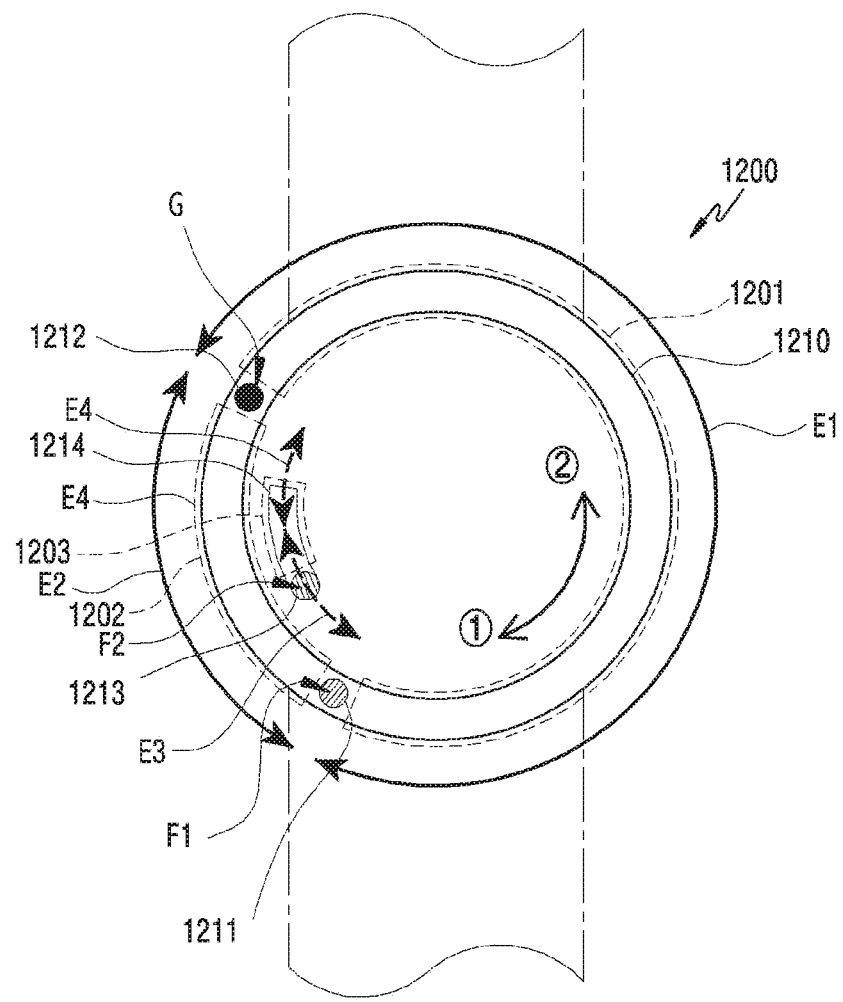
FIG. 12A is a view showing the configuration of an electronic device including an antenna according to various embodiments of the disclosure.
Figure 12B:
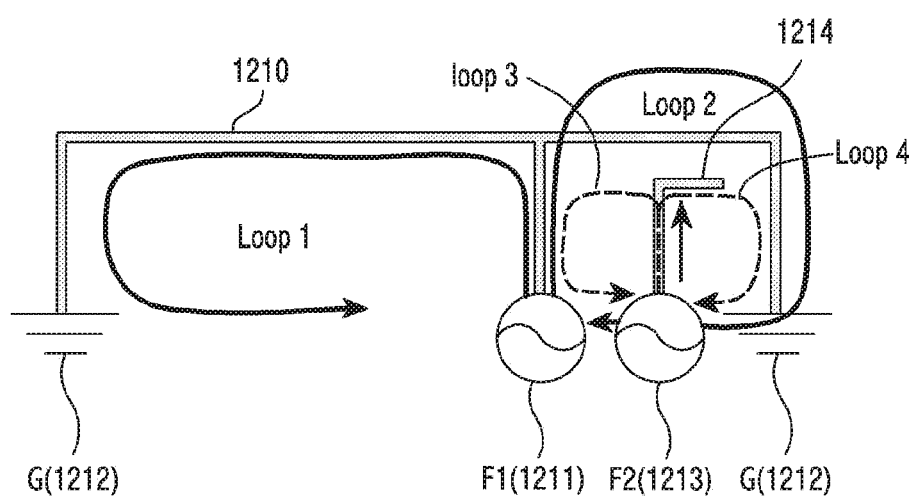
FIG. 12B is a view showing radiation paths of an, electronic device according to various embodiments of the disclosure.

FIG. 12A is a view showing the configuration of an electronic device including an antenna according to various embodiments of the disclosure. FIG. 12B is a view showing radiation paths of an electronic device according to various embodiments of the disclosure.

The electronic device 1200 shown in FIG. 12A may be at least partially similar to the electronic device 101 shown in FIG. 1, the electronic device 200 shown in FIG. 2A, or the electronic device 300 shown in FIG. 3A, or may include other embodiments of electronic devices.

Referring to FIG. 12A, the electronic device 1200 may include a first feeder F1 electrically connected with a wireless communication circuit of a substrate (e.g., the substrate 380 shown in FIG. 3B) at a first point 1211 of a conductive annular member 1210, a ground. G electrically connected with a grounding region of the substrate (e.g., the substrate 380 shown in FIG. 3B) at a second point 1212 spaced a predetermined distance apart from the first point 1211 of the conductive annular member 1210 in a predetermined direction (e.g., the direction 1̂), a second feeder F2 electrically connected with the wireless communication circuit of the substrate (e.g., the substrate 380 shown in FIG. 3C) at a third point 1213 positioned between the first point 1211 and the second point 1212 of the conductive annular member 1210, and a conductive pattern 1214. According to an embodiment, a first region 1201 of the conductive annular member 1210 defined between the first point. 1211 and the second point 1212 may be set to have a first length E1 and a second region 1202 of the conductive annular member 1210 defined between the first point 1211 and the second point 1212 may be set to have a second length E2 smaller than the first length E1. According to an embodiment, the conductive pattern 1214 may have an extension 1203 (e.g., a radiating portion) extending along at least a portion of the conductive annular member 1210. According to an embodiment, the conductive pattern 1214 may extend along at least a portion of the second region 1202.

According to various embodiments, the conductive annular member 1210 may operate as a first antenna using the first feeder F1 and the ground G. According to an embodiment, the conductive annular member 1210 can operate as a first antenna having a first electrical length E1 defined from the first point 1211 to the second point 1212 in the direction and a second electrical length E2 defined from the first point 1211 to the second point 1212 in the direction 1̂. According to an embodiment, the conductive pattern 1214 can operate as a second antenna having a third electrical length E3 defined from the third point 1213 to the first point 1211 in the direction 2̂ and a fourth electrical length E4 defined from the third point 1213 to the second point 1212 in the direction 1̂.

Referring to FIG. 12B, the first antenna can operate in different frequency bands by a first radiation path (loop 1) having the first electrical length E1 corresponding to a first region 1201 of the conductive annular member 1210 and a second radiation path (loop 2) having the second electrical length E2 corresponding to a second region 1202 of the conductive annular member 1210. According to an embodiment, the second antenna is disposed along at least a portion of the first region 1202 and can operate in different frequency bands by a third radiation path (loop 3) having a third electrical length E3 from a portion of the extension 1203 of the conductive pattern 1214 to the first point 1211 of the conductive annular member 1210 and a fourth radiation path (loop 4) having a fourth electrical length E4 from a portion of the extension 1203 of the conductive pattern 1214 to the second point 1212 of the conductive annular member 1210.

According to various embodiments, the second antenna operating through the conductive pattern 1214 can operate in a higher frequency band (e.g., 3.5 GHz) because the third electrical length E3 may be smaller than the third electrical length E3 formed by the conductive pattern 4131 shown in FIG. 4A.

According to various embodiments of the disclosure, it is possible to increase or decrease the operation frequency band of the second antenna using the conductive pattern 1214 and shift the operation frequency band to a predetermined position by changing the length, shape, or position of the conductive pattern 1214 disposed to be able to be coupled to the conductive annular member 1210 in the radiation path of the conductive annular member 1210 used as the first antenna.

Figure 13A:
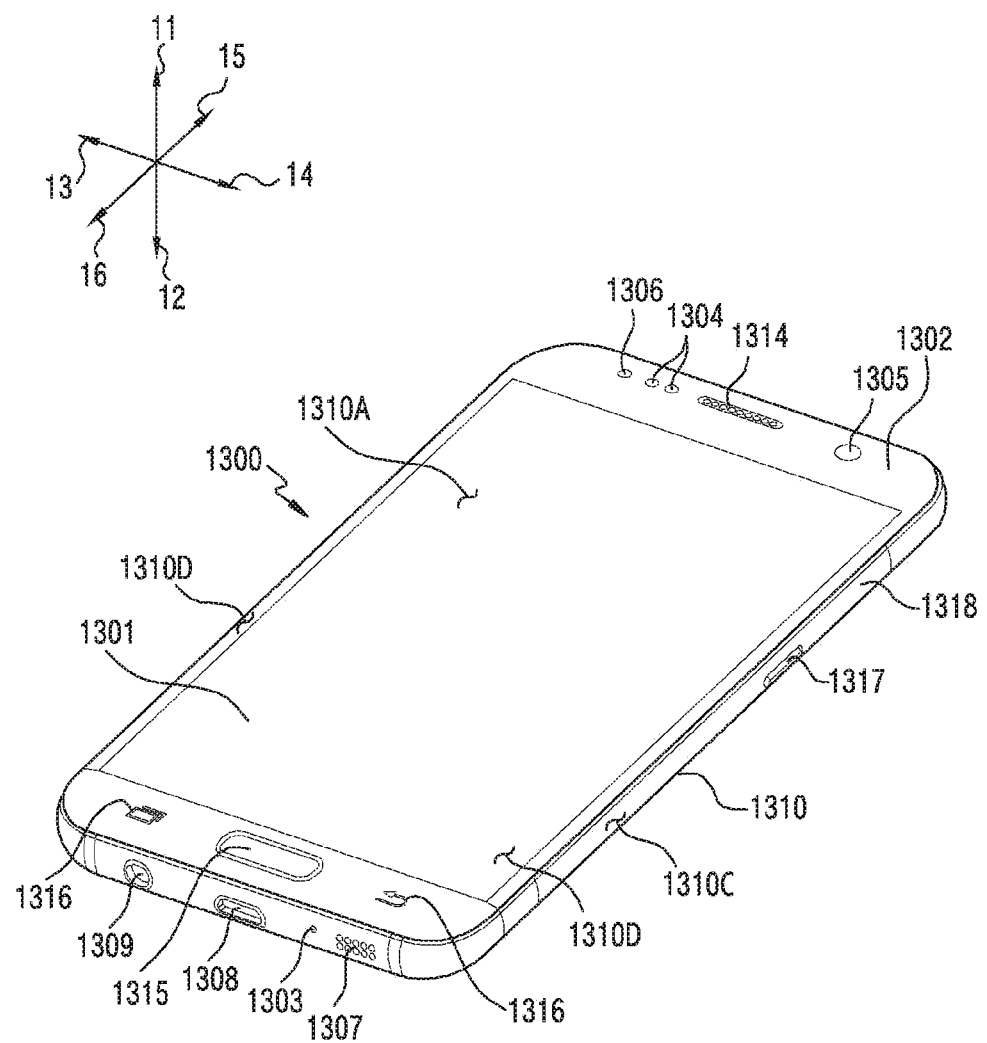
FIG. 13A is a front perspective view of a mobile electronic device according to various embodiments of the disclosure.
Figure 13B:
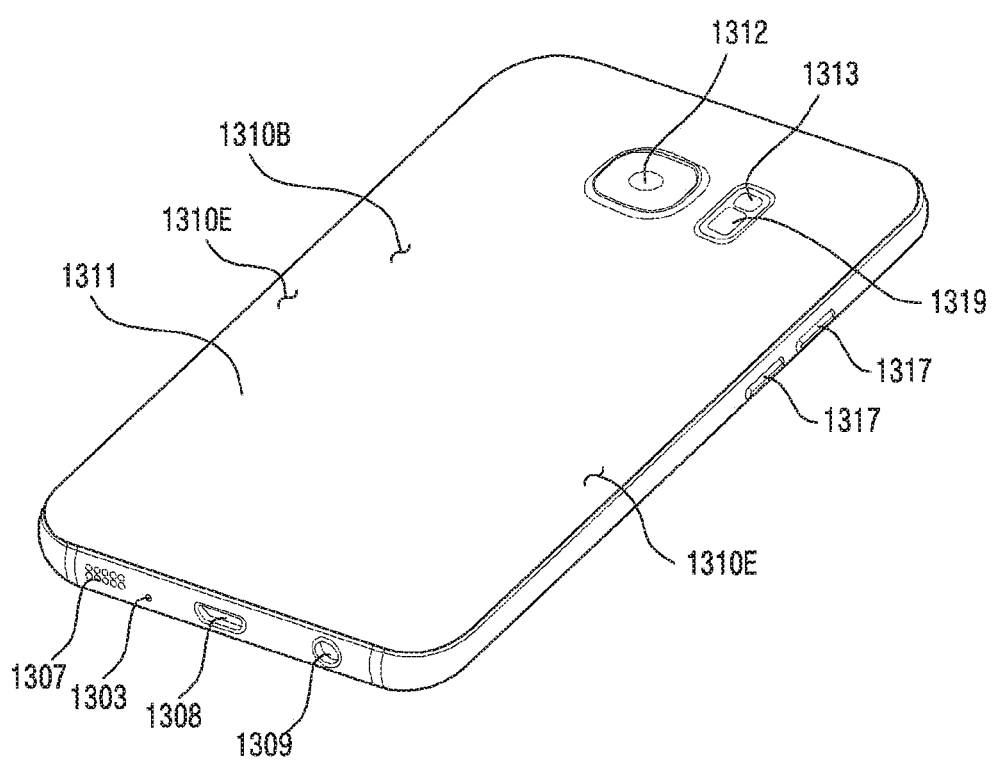
FIG. 13B is a rear perspective view of the electronic device according to various embodiments of the disclosure shown in FIG. 13A.

FIG. 13A is a perspective view illustrating a front side of an example mobile electronic device according to various embodiments of the present disclosure; FIG. 13B is a perspective view illustrating a back side of an example electronic device of FIG. 13A according to various embodiments of the present disclosure;

The electronic device of FIG. 13A may be at least partially similar to the electronic device 101 of FIG. 1, or may include other embodiments of the electronic device.

Referring to FIG. 13A and FIG. 13B, an electronic device 1300 according to an embodiment may include a housing 1310 including a first side (or a front side) 1310A, a second side (or a rear side) 1310B, and a lateral side (surface) 1310C surrounding a space between the first side 1300A and the second side 1310B. In another embodiment (not shown), the housing may refer to a structure which includes part of the first side 1310A, second side 1310B, and third side 1310C of FIG. 13A. According to an embodiment, the first side 1310A may be constructed of a front plate 1302 (or a front cover) (e.g., a polymer plate or a glass plate having various coating layers) which is at least partially transparent. The second side 1310B may be constructed of a rear plate 1311 (or a rear cover) which may be opaque. For example, the rear plate 1311 may be constructed, for example, and without limitation, of coated or colored glass, ceramic, polymer, metallic materials (e.g. aluminum, stainless steel (STS), or magnesium, a combination of at least two of these materials, or the like. The lateral side 1310C (or a side member or side surface) may be constructed of a lateral bezel structure (or a lateral member) 1318 bonded to the front plate 1302 and the rear plate 1311 and including, for example, and without limitation, metal and/or polymer. In some embodiments, the rear plate 1311 and the lateral bezel structure 1318 may be constructed integrally and may include the same material (e.g., a metallic material such as aluminum).

In the illustrated embodiment, tale front plate 1302 may include a first region 1310D that bends from the first side 1310A toward the rear plate and extends seamlessly, at both end of a long edge of the front plate. In the illustrated embodiment (referring FIG. 13B), the rear plate 1311 may include a second region 1310E that extends from the second side 1310B toward the front plate and extends seamlessly, at both ends of the long edge. In various example embodiments, the front plate or the rear plate may comprise only one of the first region or the second region. In various example embodiments, the front plate 1302 does not include a first region and a second region, and may include only a flat plane disposed in parallel with the second side 1310B. In the above embodiments, as viewed from the side of the electronic device, the lateral bezel structure has a first thickness (or width) on the side where the first region or the second region is not included, and a second thickness that is thinner than the first thickness on the side including the first region or the second region.

According to an embodiment, the electronic device 1300 may include, for example, and without limitation, at least one or more of a display 1301, an input device 1303, audio output devices 1307, and 1314, sensor modules 1304, 1319, camera modules 1305, 1312, and 1313, and key input devices 1315, 1316 and 1317, an indicator 1306, and connector holes 1308 and 1309. In various example embodiments, the electronic device 1300 may omit at least one (e.g., the key input devices 1315, 1316 and 1317 or the indicator 1306) of these components or may additionally include other components.

The display 1301 may be exposed through, for example, some portions of the front plate 1302. In an example embodiment, A portion of the display 1301 may be exposed through the front plate 1302 forming the first side 1310A and the first region 1310D of the lateral side 1310C. The display 1301 may be disposed adjacent to or bonded to, for example, and without limitation, a touch sensing circuit, a pressure sensor capable of measuring touch strength (pressure), and/or a digitizer for detecting a stylus pen of a magnetic field type. In an example embodiment, at least portion of the sensor modules 1304, 1319 and/or at least portion of the key input devices are disposed on the first portion 1310D and/or the second portion 1310E.

The audio modules 1303, 1307, and 1314 may include a microphone hole 1303 and speaker holes 1307 and 1314. A microphone for acquiring external sound may be disposed inside the microphone hole 1303. In some embodiments, a plurality of microphones may be disposed to sense a direction of the sound. The speaker holes 1307 and 1314 may include the external speaker hole 1307 and the receiver hole 1314 for a call. In some embodiments, the speaker holes 1307 and 1314 and the microphone hole 1303 may be implemented as a single hole, or a speaker (e.g., a piezo speaker) may be included without the speaker holes 1307 and 1314.

The sensor modules 1304 and 1319 may generate an electrical signal or data value corresponding to an internal operating state of the electronic device 1300 or an external environmental state. The sensor modules 1304 and 1319 may include, for example, the first sensor module 1304 (e.g., a proximity sensor) and/or second sensor module (not shown) (e.g., a fingerprint sensor) disposed to the first side 1310A of the housing 1310, and/or the third sensor module 1319 (e.g., an HRM sensor) disposed to the second side 1310B of the housing 1310. The fingerprint sensor may be disposed to a portion of the first side 1310A (e.g., a home key button 1315) or the second side 1310B of the housing or below the display 1301. The electronic device 1300 may further include at least one of a sensor module (not shown), for example, and without limitation, a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, an illumination sensor 1304, or the like.

The camera modules 1305, 1312, and 1313 may include the first camera device 1305 disposed to the first side 1310A of the electronic device 1300, the second camera device 1312 disposed to the second side 1310B, and/or the flash 1313. The camera modules 1305 and 1312 may include one or more lenses, an image sensor, and/or an image signal processor. The flash 1313 may include, for example, and without limitation, a Light Emitting Diode (LED), a xenon lamp, or the like. In some embodiments, two or more lenses (wide angle and telephoto lenses) and image sensors may be disposed to one side of the electronic device 1300.

The key input devices 1315, 1316, and 1317 may include the home key button 1315 disposed to the first side 1310A of the housing 1310, the touch pad 1316 disposed around the home key button 1315, and/or the side key button 1317 disposed to the lateral side 1310C of the housing 1310. In another embodiment, the electronic device 1300 may not include some or all of the aforementioned key input devices 1315, 1316, and 1317. The key input devices 1315, 1316, and 1317, which are not included, may be implemented using a soft key displayed on the display 1301 or a in a pressure sensor included in the display 1301.

The indicator 1306 may be disposed to, for example, the first side 1310A of the housing 1310. The indicator 1306 may provide, for example, state information of the electronic device 1300 in an optical form and may include an LED (light emitting diode).

The connector holes 1308 and 1309 may include the first connector hole 1308 capable of accommodating a connector (e.g., a USB connector) for transmitting/receiving power and/or data of an external electronic device and/or the second connector hole or earphone jack 1309 capable of accommodating a connector for transmitting/receiving an audio signal with respect to the external electronic device.

Figure 13C:
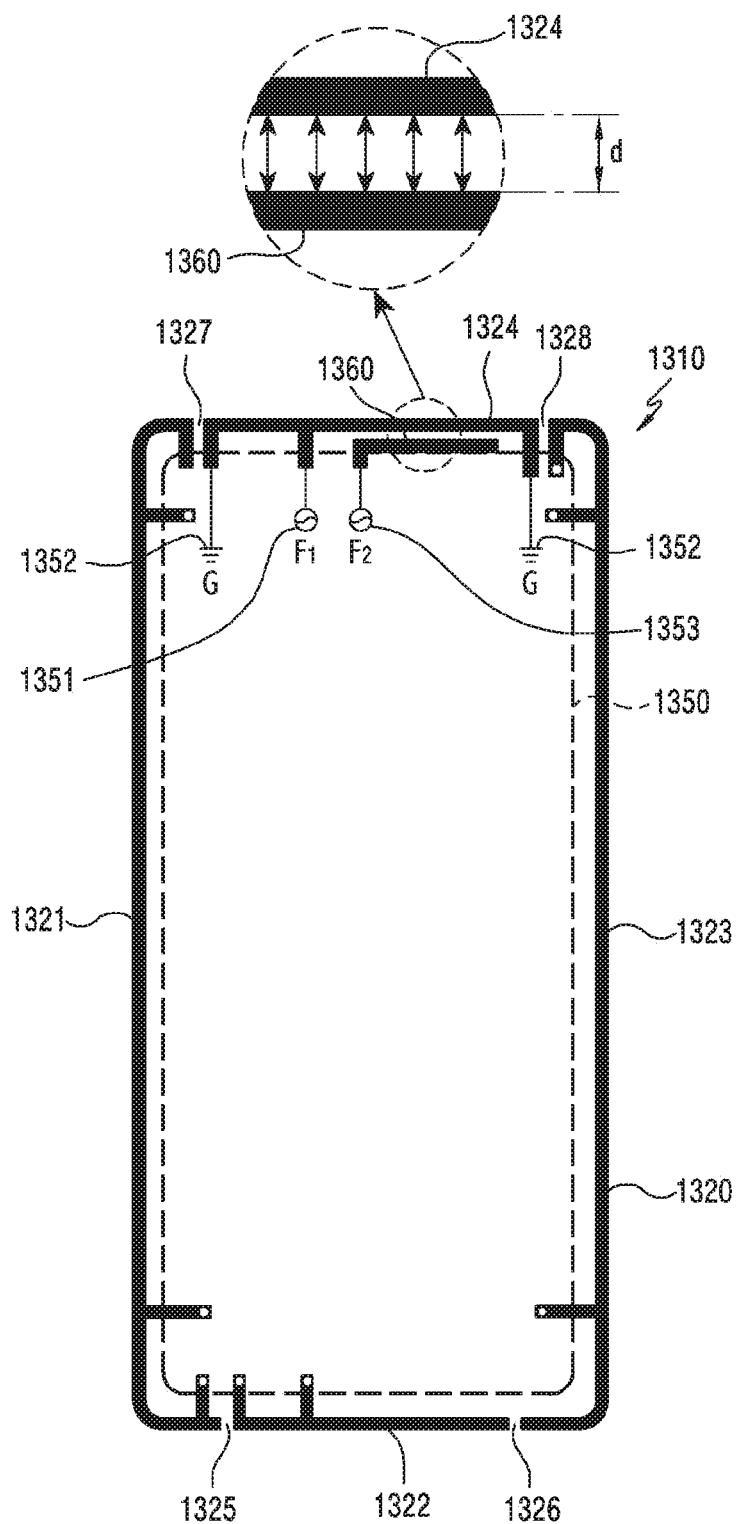
FIG. 13C is a view showing the configuration of an antenna of an electronic device according to various embodiments of the disclosure.

FIG. 13C is a view showing the configuration of an antenna of an electronic device according to various embodiments of the disclosure.

Referring to FIG. 13C, a fourth portion 1324, which is disposed on the electronic device 1300 and is defined as a conductive unit portion by being physically separated by a pair of nonconductive portions 1327 and 1328, may be used as an antenna. According to an embodiment, the electronic device 1300 may include a conductive pattern 1360 disposed therein to be coupled to the fourth portion 1324.

According to various embodiments, the fourth portion 1324 may be electrically connected with the grounding region of the substrate 1350. According to an embodiment, the fourth portion 1324 may be electrically connected with the ground G of the substrate 1350 at least at two points. According to an embodiment, the fourth portion 1324 may be electrically connected to a first feeder F1 of the substrate 1350 at any one point between the two points grounded to the substrate 1350. According to an embodiment, the fourth portion 1324 may have a loop-shaped radiation path passing through a grounded point from the substrate and a loop-shaped radiation path passing through another grounded point from the substrate with respect to a point where the first feeder F1 is powered.

According to various embodiments, the conductive pattern 1360 may be formed or installed on the substrate 1350 or may be disposed in the electronic device. According to an embodiment, the conductive pattern 1360 may be disposed at a position where it can be capacitively coupled to the fourth portion 1324. According to an embodiment, the conductive pattern 1360 may be electrically connected with the second feeder F2 of the substrate 1350. According to an embodiment, the conductive pattern 1360 is disposed in any one radiation path with respect to a first feeding point of the fourth portion 1324, whereby at least two other radiation paths may be formed.

According to various embodiments, in the loop structure shown in the figure, when isolation is not secured between a first antenna and a multi-feeding antenna, the mid band performance of the first antenna may be deteriorated. For example, as shown in the figure, when the second pattern 1324 that is used as a second antenna is positioned in a mid band period, it is difficult to secure isolation due to a spatial limit so performance may be deteriorated. Accordingly, in order to implement a multi-feeding antenna, it is possible to secure isolation when implementing antennas not in the same band, but in different bands, and in this case, the antenna using the conductive pattern 1324 may be implemented for a high band of 3.5 GHz.

According to various embodiments, an electronic device (e.g., the front plate 201 shown in FIG. 3A) may include: a housing (e.g., the housing 210 shown in FIG. 2A) including a front plate, a rear plate (the rear plate 393 shown in FIG. 3A) facing an opposite direction to the front plate, and a side member (e.g., the side bezel structure 310 shown in FIG. 3A) surrounding a space between the front plate and the rear plate and including a conductive annular member (e.g., the conductive annular member 410 shown in FIG. 4A) at least one mounting member (e.g., the fastening members 250 and 260 shown in FIG. 2A) connected to the side member and detachably mounted on a portion of a human body such that the rear plate faces the portion of the human body; a substrate (PCB) (e.g., the substrate 480 shown in FIG. 4A) disposed in the space in parallel with the front plate and having a ground plane (e.g., the ground plane 481 shown in FIG. 4A); at least one wireless communication circuit (e.g., the wireless communication circuit 482 shown in FIG. 4A) disposed on the substrate; a first electrical path (e.g., the first electrical path 4801 shown in FIG. 4A) connected between the wireless communication circuit and a first point (e.g., the first point 411 shown in FIG. 4A) of the conductive annular member; a second electrical path (e.g., the second electrical path 4802 shown in FIG. 4A) connected between the ground plane and a second point (e.g., the second point 412 shown in FIG. 4A) of the conductive annular member in which a first region (e.g., the first region 4101 shown in FIG. 4A) of the conductive annular member defined between the first point and the second point has a first length (e.g., the first length E1 shown in FIG. 4A) and a second region (e.g., the second region 4102 shown in FIG. 4A) of the conductive annular member defined between the first point and the second point has a second length (e.g., the second length E2 shown in FIG. 4A) smaller than the first length; and a conductive pattern (the conductive pattern 4131 shown in FIG. 4A) disposed in the space, having an extension (e.g., the extension 4103 shown in FIG. 4A) that extends along a portion of the first region or the second region of the annular member, and electrically connected to the wireless communication circuit.

According to various embodiments, the extension may extend along a portion of the first region of the conductive annular member.

According various embodiments, the wireless communication circuit may be configured to provide a first signal having a first frequency at the first point and a second signal having a second frequency different from the first frequency at the conductive pattern.

According to various embodiments, the second frequency may be higher than the first frequency.

According to various embodiments, the first frequency may have a first range of 700 MHz~900 MHz and the second frequency may have a second range of 2300 MHz~2700 MHz.

According to various embodiments, the wireless communication circuit may be configured to provide a third signal having a third frequency at the first point and the third frequency may be set to exist between the first frequency and the second frequency.

According to various embodiments, the first frequency may have a first range of 700 MHz~900 MHz, the second frequency may have a second range of 2300 MHz~2700 MHz, and the third frequency may have a third range of 1700 MHz~2100 MHz.

According to various embodiments, the extension may extend along a portion of the second region of the conductive annular member.

According to various embodiments, an operation frequency band of the second frequency may be determined, based on the position of the conductive pattern.

According to various embodiments, the operation frequency band of the second frequency may be determined, based on a coupling area between the conductive pattern and the conductive annular member.

According to various embodiments, the electronic device may further include a supporting member disposed in the space, and the conductive pattern may be disposed on the supporting member.

According to various embodiments, the electronic device may further include a display exposed through at least a portion of the front plate, the supporting member may have a first member surface facing the first surface, a second member surface facing the second surface, and member side surrounding a space between the first member surface and the second member surface, the display may be disposed on the first member surface, and the substrate may be disposed on the second member surface.

According to various embodiments, the conductive pattern may be disposed on the first member surface around the member side or through a space of the supporting member from the substrate.

According to various embodiments, the extension of the conductive pattern may be coupled to an inner surface of the conductive pattern through an inactive region (BM region) of the display.

According to various embodiments, the conductive pattern may include a Laser Direction Structuring (LDS), Thin Film Antenna (TFA), Flexible Printed Circuit Board (FPCB), or Steel Use Stainless (SUS) type pattern disposed in a nonconductive portion of the supporting member.

According to various embodiments, the electronic device may be a wearable device that can be worn on a human body.

According to various embodiments, an electronic device includes: a housing including a front plate, a rear plate facing an opposite direction to the front plate, and a side member surrounding a space between the front plate and the rear plate, in which the side member has a substantially rectangular shape when seen from above the front plate and has a first portion having a first length and extending in a first direction, a second portion having a second length larger than the first length and extending in a second direction perpendicular to the first direction, a third portion having the first length and extending in the first direction in parallel with the first portion, and a fourth portion having the second length and extending in the second direction in parallel with the second portion; a substrate disposed in the space and having a ground electrically connected with two points spaced a predetermined distance apart from each other in the fourth portion; a wireless communication circuit mounted on the substrate, electrically connected to a first point between the two points in the fourth portion, and providing wireless communication in a first frequency range; and a conductive pattern disposed at a position where it can be coupled to the fourth portion, and electrically connected with the wireless communication circuit, in which the wireless communication circuit may be configured to provide wireless communication in a second frequency band.

According to various embodiments, the first frequency may include a low band in the range of 700 MHz~900 MHz and/or a mid band in the range of 1700 MHz~2100 MHz.

According to various embodiments, the second frequency may include a high band of 3.5 GHz or more.

According to various embodiments, as operation frequency band of the conductive pattern may be determined, based on a coupling position and/or a coupling area of the conductive pattern.

Further, the embodiments described and shown is the specification and the drawings are specific examples for easily explaining the disclosure and helping understand an embodiment the disclosure and do not limit the scope of the disclosure. Therefore, other than the embodiments described herein, all of changes or modifications based on the spirit of the disclosure should be construed as being included in the scope of the disclosure.

The invention claimed is:

1. An electronic device comprising:
    a housing including a front plate, a rear plate facing an opposite direction to the front plate, and a side member surrounding a space between the front plate and the rear plate and including a conductive annular member;
    a display exposed through at least a portion of the front plate;
    a supporting member disposed in the space;
    at least one mounting member connected to the side member and detachably mounted on a portion of a human body such that the rear plate faces the portion of the human body;
    a substrate disposed in the space, the substrate including a ground plane;
    at least one wireless communication circuit disposed on the substrate;
    a first electrical path between the wireless communication circuit and a first point of the conductive annular member;
    a second electrical path between the ground plane and a second point of the conductive annular member in which a first region of the conductive annular member defined between the first point and the second point has a first length and a second region of the conductive annular member defined between the first point and the second point has a second length smaller than the first length; and
    a conductive pattern disposed on the supporting member, the conductive pattern having an extension and being electrically connected to the wireless communication circuit,
    wherein the supporting member has a first surface facing the front plate, a second surface facing the rear plate, and a side surface surrounding the space between the first surface and the second surface, and
    wherein the display is disposed on the first surface, and the substrate is disposed on the second surface.

2. The electronic device of claim 1, wherein the extension extends along a portion of the first region of the conductive annular member.

3. The electronic device of claim 2, wherein the wireless communication circuit is configured to provide a first signal having a first frequency to the first point and a second signal having a second frequency different from the first frequency to the conductive pattern.

4. The electronic device of claim 3, wherein the second frequency is higher than the first frequency.

5. The electronic device of claim 3, wherein the first frequency is between 700 MHz and 900 MHz, and the second frequency is between 2300 MHz and 2700 MHz.

6. The electronic device of claim 3, wherein the wireless communication circuit is configured to provide a third signal having a third frequency at the first point and the third frequency exists between the first frequency and the second frequency.

7. The electronic device of claim 6, wherein the first frequency is between 700 MHz and 900 MHz, the second frequency is between 2300 MHz and 2700 MHz, and the third frequency is between 1700 MHz and 2100 MHz.

8. The electronic device of claim 1, wherein the extension extends along a portion of the second region of the conductive annular member.

9. The electronic device of claim 3, wherein an operation frequency band of the second frequency is based on a position of the conductive pattern.

10. The electronic device of claim 3, wherein an operation frequency band of the second frequency is based on a coupling area between the conductive pattern and the conductive annular member.

11. The electronic device of claim 1, wherein the conductive pattern is disposed on the first surface around the side surface or through the space of the supporting member from the substrate.

12. The electronic device of claim 1, wherein the extension of the conductive pattern is coupled to an inner surface of the conductive pattern through an inactive region of the display.

13. The electronic device of claim 1, wherein the conductive pattern includes a laser direct structure, a thin film antenna, a flexible printed circuit board, or a stainless steel type pattern disposed in a nonconductive portion of the supporting member.

* * * * *